US012550200B2

(12) United States Patent
Xiong et al.

(10) Patent No.: US 12,550,200 B2
(45) Date of Patent: Feb. 10, 2026

(54) MULTIPLE PHYSICAL RANDOM ACCESS CHANNEL (PRACH) TRANSMISSIONS FOR COVERAGE ENHANCEMENT

(71) Applicant: Intel Corporation, Santa Clara, CA (US)

(72) Inventors: Gang Xiong, Portland, OR (US); Prerana Rane, Newark, CA (US); Sergey Sosnin, Zavolzhie (RU)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 18/164,258

(22) Filed: Feb. 3, 2023

(65) Prior Publication Data
US 2023/0189347 A1    Jun. 15, 2023

Related U.S. Application Data

(60) Provisional application No. 63/408,770, filed on Sep. 21, 2022, provisional application No. 63/306,702, filed on Feb. 4, 2022.

(51) Int. Cl.
*H04W 74/08* (2024.01)
*H04W 74/0833* (2024.01)

(52) U.S. Cl.
CPC ... *H04W 74/0891* (2013.01); *H04W 74/0833* (2013.01)

(58) Field of Classification Search
CPC ......... H04W 74/0833; H04W 74/0891; H04W 56/0015; H04W 74/006
See application file for complete search history.

(56) References Cited

U.S. PATENT DOCUMENTS

| | | | |
|---|---|---|---|
| 2015/0124746 A1* | 5/2015 | Wu | H04W 74/0833 370/329 |
| 2021/0307061 A1* | 9/2021 | Huang | H04W 74/0808 |
| 2024/0422834 A1* | 12/2024 | Khoshkholgh Dashtaki | H04W 74/0866 |
| 2025/0063438 A1* | 2/2025 | Rastegardoost | H04W 36/08 |

OTHER PUBLICATIONS

3GPP, "Technical Specification Group Radio Access Network; NR; Physical layer procedures for control (Release 17)," 3GPP TS 38.213 V17.0.0 (Dec. 2021), 5G, 225 pages.

* cited by examiner

*Primary Examiner* — Nizam U Ahmed
(74) *Attorney, Agent, or Firm* — Gray Ice Higdon, PLLC

(57) ABSTRACT

Various embodiments herein provide techniques for multiple physical random access channel (PRACH) transmissions for coverage enhancement. For example, embodiments may relate to PRACH window determination for multiple PRACH transmissions. In one example, the PRACH repetition window is determined in accordance with a number of consecutive valid PRACH occasions associated with a synchronization signal block (SSB). Other embodiments may be described and claimed.

18 Claims, 13 Drawing Sheets

1300 encode, for transmission to a user equipment (UE), configuration information to indicate physical random access channel (PRACH) occasions associated with respective synchronization signal blocks (SSBs)
1302 determining a physical random access channel (PRACH) repetition window to include a number of consecutive valid PRACH occasions of a first SSB of the SSBs
1304 receiving a PRACH preamble in the valid PRACH occasions of the PRACH repetition window
1306

Figure 13

MULTIPLE PHYSICAL RANDOM ACCESS CHANNEL (PRACH) TRANSMISSIONS FOR COVERAGE ENHANCEMENT

CROSS REFERENCE TO RELATED APPLICATION

The present application claims priority to U.S. Provisional Patent Application No. 63/306,702, which was filed Feb. 4, 2022; U.S. Provisional Patent Application No. 63/408,770, which was filed Sep. 21, 2022; the disclosures of which are hereby incorporated by reference.

FIELD

Various embodiments generally may relate to the field of wireless communications. For example, some embodiments may relate to multiple physical random access channel (PRACH) transmissions for coverage enhancement.

BACKGROUND

Various embodiments generally may relate to the field of wireless communications. Mobile communication has evolved significantly from early voice systems to today's highly sophisticated integrated communication platform. The next-generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

For cellular systems, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 13 depicts another example procedure for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for multiple physical random access channel (PRACH) transmissions for coverage enhancement. For example, embodiments may relate to PRACH window determination for multiple PRACH transmissions.

Figure 1:
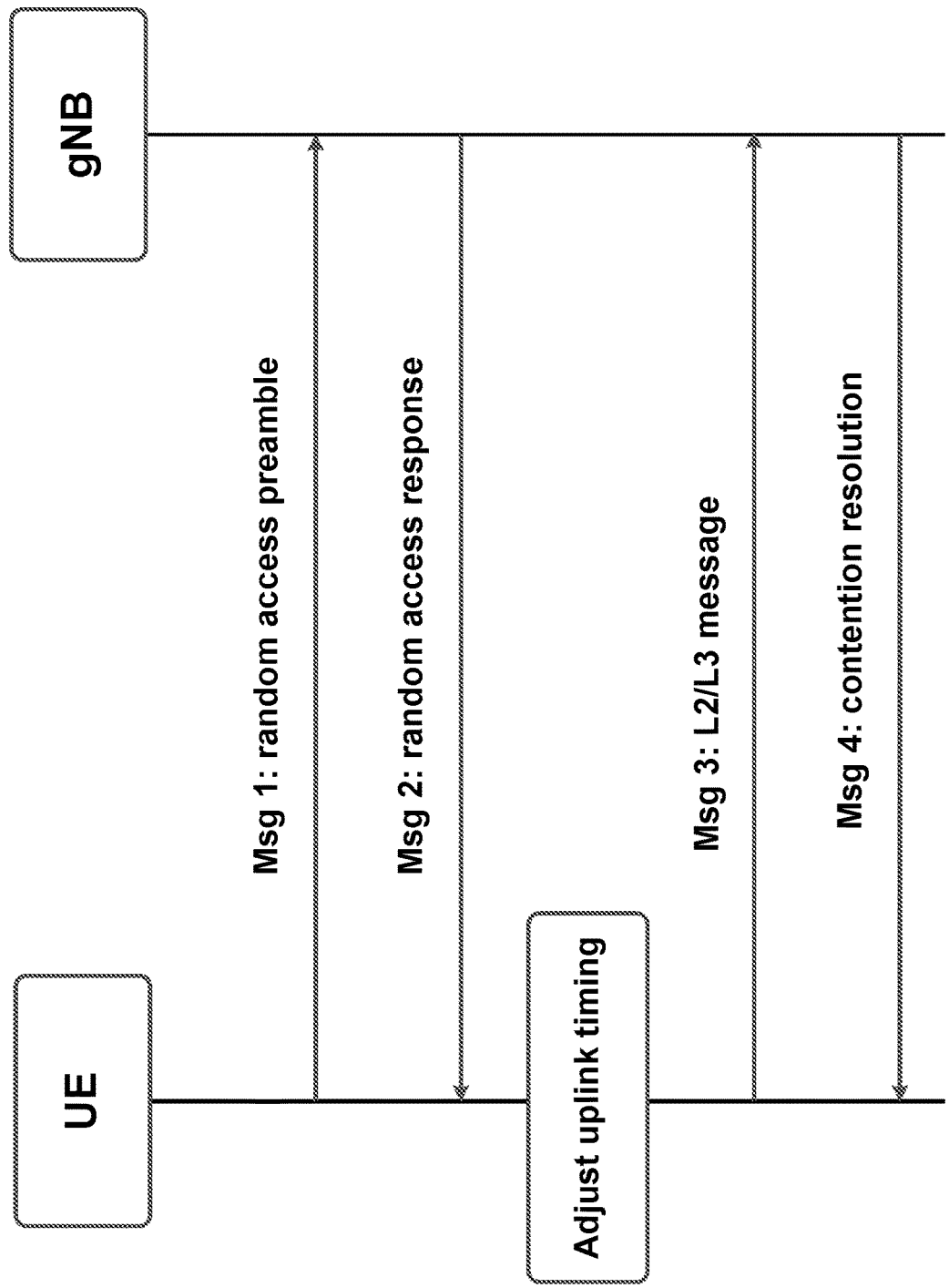
FIG. 1 illustrates a 4 step random access channel (RACH) procedure, in accordance with various embodiments.

In NR Rel-15, a 4-step random access channel (RACH) procedure was defined. FIG. 1 illustrates the 4-step RACH procedure for initial access. In the first step, the user equipment (UE) transmits PRACH in the uplink by randomly selecting one preamble signature, which would allow the next generation Node B (gNB) to estimate the delay between gNB and UE for subsequent UL timing adjustment. Subsequently, in the second step, gNB feedbacks the random access response (RAR) which carries timing advanced (TA) command information and uplink grant for the uplink transmission in the third step. The UE expects to receive the RAR within a time window, of which the start and end are configured by the gNB via system information block (SIB).

As defined in NR Rel-15, number of repetitions is 2 and 4 for PRACH format 1 and 2, respectively, which can help in improving the coverage for long PRACH format. However, for short PRACH format, repetition is not defined. Note that PRACH transmission is very important for many procedures, e.g., initial access and beam failure recovery. In order to improve the coverage for PRACH, especially short PRACH format, multiple PRACH transmissions can be considered.

Among other things, embodiments of the present disclosure are directed to multiple PRACH transmissions for coverage enhancement. In particular, some embodiments are directed to PRACH repetition window determination for multiple PRACH transmissions, and determination of the association period for mapping SSB to PRACH occasions.

PRACH Repetition Window Determination for Multiple PRACH Transmissions

As mentioned above, in NR Rel-15, for 4-step contention based RACH, a UE is provided a number N of synchronization signal block (SSB) indexes associated with one PRACH occasion and a number R of contention based preambles per SSB index per valid PRACH occasion. When N<1, one SSB index is mapped to 1/N consecutive valid PRACH occasions. When N≥1, N SSB indexes are associated with a PRACH occasion, R contention based preambles with consecutive indexes associated with SSB index n, 0≤n≤N−1, per valid PRACH occasion.

Note that in Rel-15, the number of repetitions is 2 and 4 for PRACH format 1 and 2, respectively, which can help in improving the coverage for the long PRACH format. However, for short PRACH format, repetition is not defined. Note that PRACH transmission is very important for many procedures, e.g., initial access and beam failure recovery. In order to improve the coverage for PRACH, especially short PRACH format, multiple PRACH transmissions can be considered.

Embodiments of PRACH repetition window determination for multiple PRACH transmissions are provided as follows:

In one embodiment, for multiple PRACH transmissions, the PRACH repetition window is associated with a synchronization signal block (SSB). In particular, the PRACH repetition window is determined in accordance with a number of consecutive valid PRACH occasions associated with an SSB. In this case, the PRACH repetition window is determined based on the SSB to RO mapping. Note that depending on the number of SSBs and SSB to RO mapping ratio, the PRACH repetition window may not be consecutive in terms of the ROs.

In one option, the consecutive valid PRACH occasions associated with an SSB are the PRACH occasions that are multiplexed in the time domain. In this case, when multiple PRACH occasions are configured in frequency in a time instance, e.g., when msg1-FDM>1, UE may skip PRACH occasions in the same time instance for association with an SSB to determine the PRACH repetition window. For this option, UE may transmit different PRACH preambles using the same or different Tx beam if the PRACH occasions associated with an SSB are multiplexed in the time division multiplexing (TDM) manner.

In another option, the consecutive valid PRACH occasions associated with an SSB are the PRACH occasions that can be multiplexed either in the time domain or in the frequency domain or both. In this case, when multiple PRACH occasions are configured in frequency in a time instance, UE may associate more than one valid PRACH occasions that multiplexed in a frequency division multiplexing (FDM) manner with an SSB.

Figure 2:
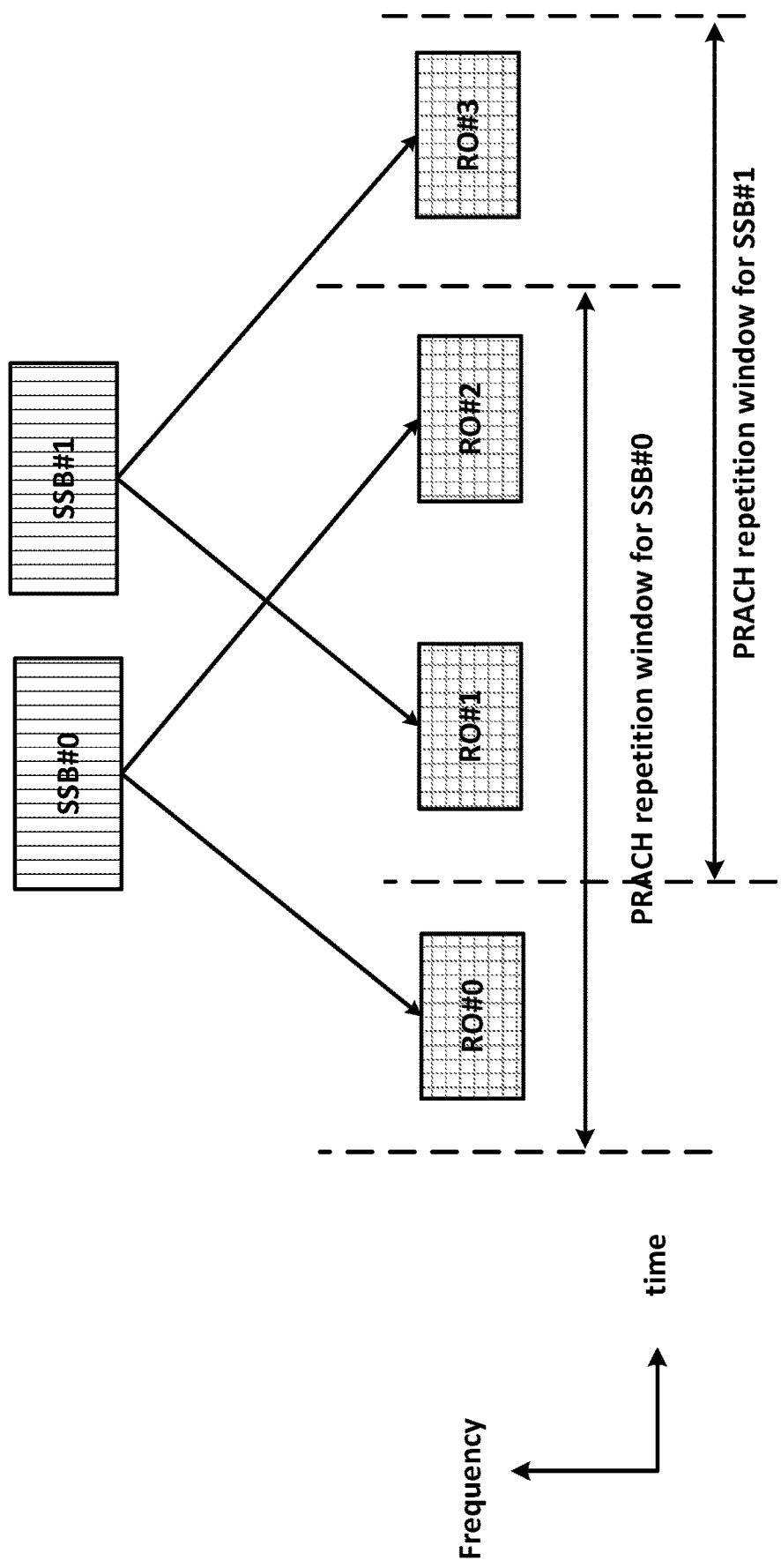
FIG. 2 illustrates an example of PRACH repetition window determination for multiple PRACH transmissions with a ratio, N, of synchronization signal block (SSB) indexes per PRACH occasion, of one, in accordance with various embodiments.

FIG. 2 illustrates one example of PRACH repetition window determination for multiple PRACH transmissions. In the example, 2 SSBs are configured and one SSB is associated with a PRACH occasion, e.g., N=1. In addition, the PRACH repetition window size is 2 PRACH occasions. PRACH repetition window for SSB #0 is determined as RO #0 and #2 while the PRACH repetition window for SSB #0 is determined as RO #1 and #3.

Figure 3:
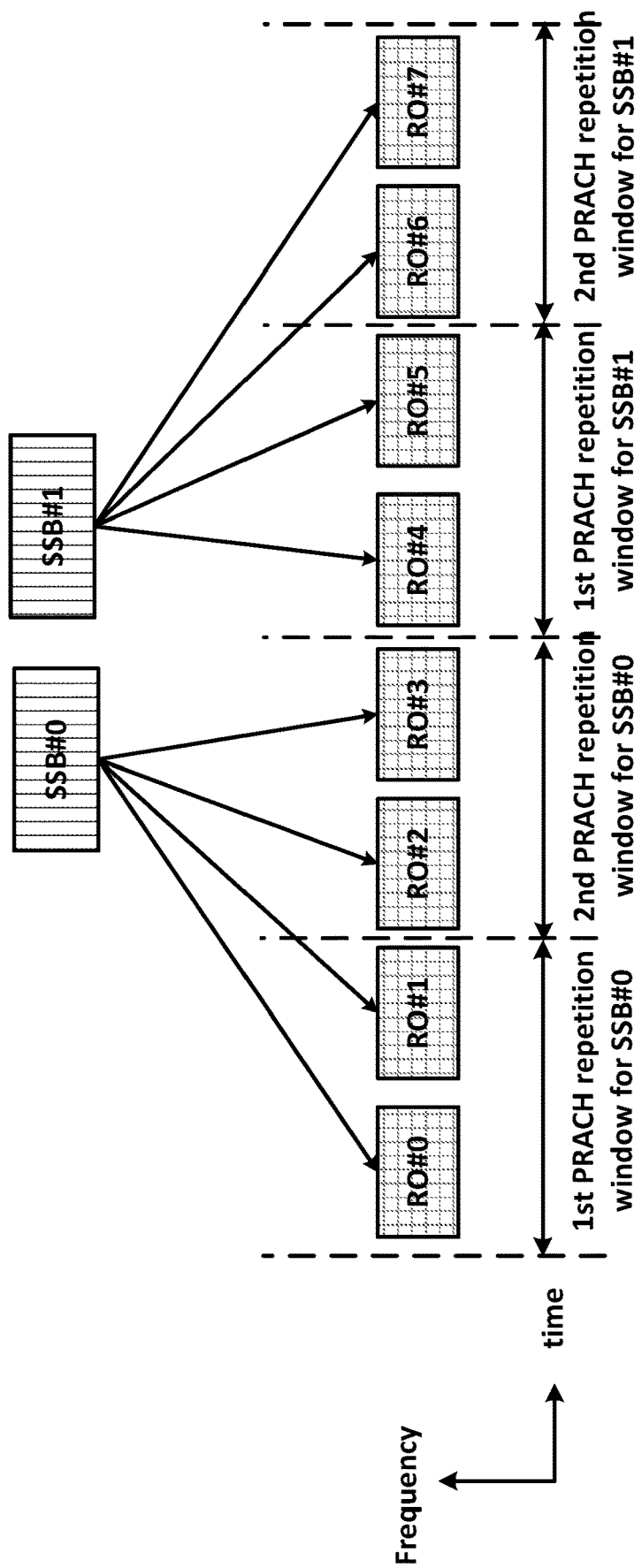
FIG. 3 illustrates an example of PRACH window determination for multiple PRACH transmissions with N<1, in accordance with various embodiments.

FIG. 3 illustrates one example of PRACH repetition window determination for multiple PRACH transmissions. In the example, 2 SSBs are configured and one SSB is associated with 4 PRACH occasions, e.g., N=¼. In addition, the PRACH repetition window size is 2 PRACH occasions. A first PRACH repetition window for SSB #0 is determined as RO #0 and #1, while a second PRACH repetition window for SSB #0 is determined as RO #2 and #3. Further, a first PRACH repetition window for SSB #1 is determined as RO #4 and #5, while a second PRACH repetition window for SSB #0 is determined as RO #6 and #7.

Note that this embodiment may be applied for the case when single PRACH transmission and multiple PRACH transmissions share the same PRACH occasion, but are allocated with separate PRACH preamble. This can also be applied for the case when single PRACH transmission and multiple PRACH transmissions are configured with separate PRACH occasions.

In another embodiment, for multiple PRACH transmissions, the PRACH repetition window is determined in accordance with a number of consecutive valid PRACH occasions. In this case, validation of PRACH occasions is first performed based on the validation rule as defined in Section 8.1 in TS 38.213, v. 17.0.0, 2022 Jan. 5. Further, the PRACH repetition window is determined based on the number of valid PRACH occasions.

In one option, the consecutive valid PRACH occasions are the PRACH occasions that are multiplexed in the time domain. In this case, when multiple PRACH occasions are configured in frequency in a time instance, e.g., when msg1-FDM>1, UE may skip PRACH occasions in a same time instance to determine the PRACH repetition window.

In another option, the consecutive valid PRACH occasions are the PRACH occasions that can be multiplexed either in the time domain or in the frequency domain or both. In this case, when multiple PRACH occasions are configured in frequency in a time instance, UE may associate more than one valid PRACH occasions that multiplexed in a frequency division multiplexing (FDM) manner with an SSB.

Note that this embodiment may be applied for the case when single PRACH transmission and multiple PRACH transmissions are configured with separate PRACH occasions.

Figure 4:
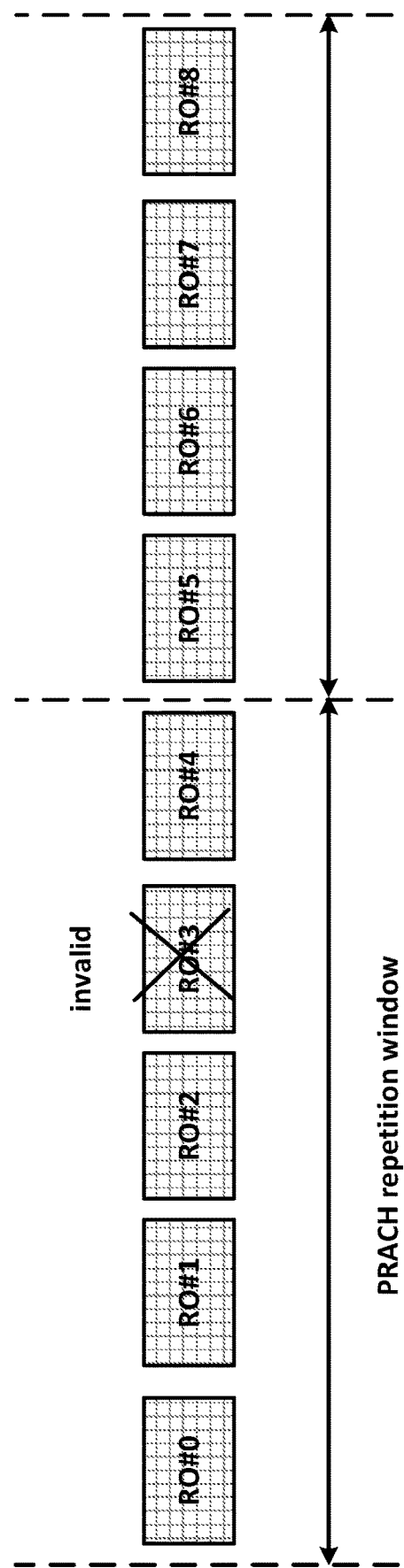
FIG. 4 illustrates another example of PRACH window determination for multiple PRACH transmissions, in accordance with various embodiments.

FIG. 4 illustrates one example of PRACH repetition window determination for multiple PRACH transmissions. In the example, the PRACH repetition window size is 4 PRACH occasions (RO). Further, RO #3 is invalid due to collision with DL symbol which is configured by TDD UL DL configuration. Based on this option, a first PRACH repetition window is determined from RO #0-4 while a second PRACH repetition window is determined from RO #5-8.

In another embodiment, for multiple PRACH transmissions, the PRACH repetition window is determined in accordance with a number of consecutive configured PRACH occasions. In this case, after the determination of the PRACH repetition window, validation of PRACH occasions is then performed based on the validation rule as defined in Section 8.1 in TS38.213 [1].

In one option, the consecutive configured PRACH occasions are the PRACH occasions that are multiplexed in the time domain. In this case, when multiple PRACH occasions are configured in frequency in a time instance, e.g., when msg1-FDM>1, UE may skip PRACH occasions in the same time instance to determine the PRACH repetition window.

In another option, the consecutive configured PRACH occasions are the PRACH occasions that can be multiplexed either in the time domain or in the frequency domain or both. In this case, when multiple PRACH occasions are configured in frequency in a time instance, UE may associate more than one PRACH occasions that multiplexed in a frequency division multiplexing (FDM) manner with an SSB.

Note that this embodiment may be applied for the case when single PRACH transmission and multiple PRACH transmissions are configured with separate PRACH occasions.

Figure 5:
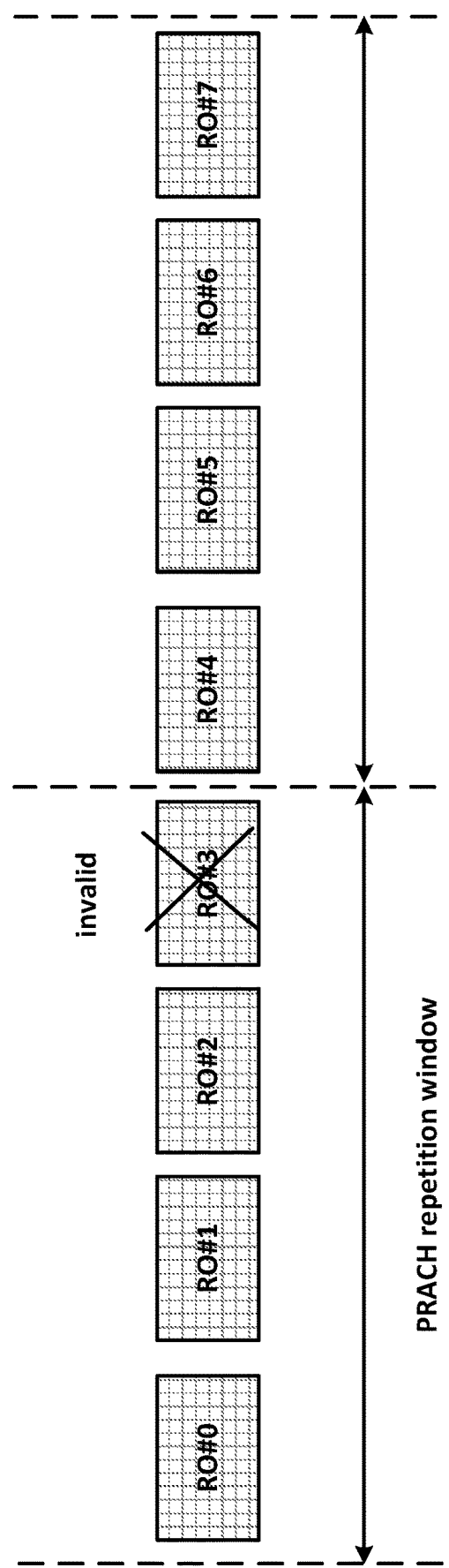
FIG. 5 illustrates another example of PRACH window determination for multiple PRACH transmissions, in accordance with various embodiments.

FIG. 5 illustrates one example of PRACH repetition window determination for multiple PRACH transmissions. In the example, the PRACH repetition window size is 4 PRACH occasions. Further, RO #3 is invalid due to collision with DL symbol which is configured by TDD UL DL configuration. Based on this option, a first PRACH repetition window is determined from RO #0-3 while a second PRACH repetition window is determined from RO #4-7.

As a further extension, within a PRACH repetition window, only when all PRACH occasions for PRACH transmission are valid, then PRACH repetitions can be transmitted in the PRACH repetition window. In this case, if any of the PRACH occasions in a PRACH repetition window is invalid, UE does not transmit the PRACH with repetition in the PRACH repetition window. In addition, the PRACH occasions in the PRACH repetition window is not associated with an SSB for SSB to RO mapping.

Note that for the above embodiments, the first PRACH repetition window may start from 0, or align with the starting position of an association period or an association pattern period.

In another embodiment, for multiple PRACH transmission, the first PRACH repetition window starts from the frame 0. Further, the PRACH repetition window is determined in accordance with the number of non-consecutive valid PRACH occasions, which are associated with an SSB. The gap between two valid PRACH occasions that are associated with the same SSB for multiple PRACH transmissions or PRACH repetitions can be determined in accordance with a number of valid PRACH occasions that are mapped to all the SSBs.

In another option, the gap between two valid PRACH occasions that are associated with the same SSB for multiple PRACH transmissions or PRACH repetitions can be determined in accordance with an association period or an association pattern period or 160 ms for mapping between SSB and PRACH occasions.

Figure 6:
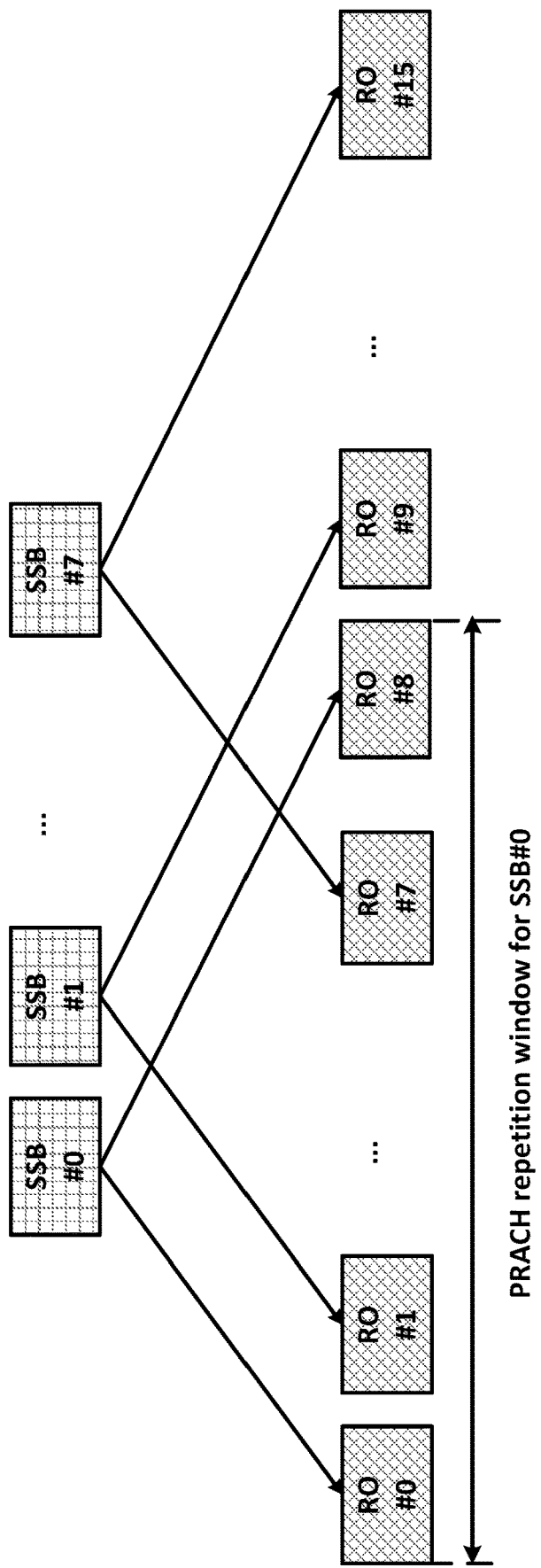
FIG. 6 illustrates another example of PRACH window determination for multiple PRACH transmissions, in accordance with various embodiments.

FIG. 6 illustrates one example of PRACH repetition window determination for multiple PRACH transmissions. In the example, 8 SSBs are configured and one SSB is associated with a PRACH occasion, e.g., N=1 based on the configuration. In addition, the PRACH repetition window size is 2 PRACH occasions. In this case, the gap between the first PRACH occasion and second PRACH occasion for 2 PRACH repetitions is 8 PRACH occasions, and PRACH repetition window for SSB #0 is determined as RO #0 and #8 for the first set of PRACH occasions.

In some aspects, this option may be applied for the case when single PRACH transmission and multiple PRACH transmissions share the same PRACH occasion, but are allocated with separate PRACH preamble.

In another embodiment, for multiple PRACH transmission, the first PRACH repetition window starts from the frame 0 and UE determines the PRACH repetition window or PRACH occasions for multiple PRACH transmissions in accordance with the following steps:

Step 1: When more than one valid PRACH occasion that is associated with an SSB is multiplexed in a frequency division multiplexing (FDM) manner, UE randomly selects one valid PRACH occasion among the more than one valid PRACH occasion corresponding to the first PRACH repetition; Otherwise, UE selects one valid PRACH occasion associated with an SSB corresponding to the first PRACH repetition. In some aspects, the SSB is determined in accordance with the existing mechanism, e.g., with measured RSRP greater than a configured threshold.

Step 2: UE continues to determine a first set of valid PRACH occasions for multiple PRACH transmission for the first set of PRACH repetitions, where the set of valid PRACH occasions are associated with the same SSB and have the same frequency resource with the selected valid PRACH occasion in the first step, until the number of determined valid PRACH occasions is equal to the number of repetitions for multiple PRACH transmissions.

Step 3: UE continues to determine the second set of valid PRACH occasions for the second set of PRACH repetitions following the rule in the Step 1 and/or Step 2. The UE may select the valid PRACH occasion with the same frequency resource as the selected valid PRACH occasion in the Step 1 or randomly selects one valid PRACH occasion from more than one FDM'ed valid PRACH occasions.

In some aspects, the association between SSB and PRACH occasion is determined in accordance with the association rule defined in Section 8.1 in TS38.213.

In some aspects, PRACH occasions in the first and second set of valid PRACH occasions may be non-consecutive in time domain. In particular, valid PRACH occasions used for the PRACH repetitions can be the ones mapped to the same SSB after valid PRACH occasions are associated with all the SSBs.

In one option, the set of PRACH occasions may be determined within an association period or an association pattern period or 160 ms. In another option, the set of valid PRACH occasions for multiple PRACH transmission may be determined within a value in accordance with the number of repetitions or maximum number of repetitions configured for multiple PRACH transmission. In one example, the set of valid PRACH occasions for multiple PRACH transmission PRACH where be determined within $N_{PRACH}^{Repeat} \cdot 160$ ms, where $N_{PRACH}^{Repeat}$ is the number of repetitions for PRACH transmission.

In some aspects, this option may be applied for the case when single PRACH transmission and multiple PRACH transmissions share the same PRACH occasion, but are allocated with separate PRACH preamble. In other aspects, this option may be applied for the case when single PRACH transmission and multiple PRACH transmissions are configured with different PRACH occasions.

Figure 7:
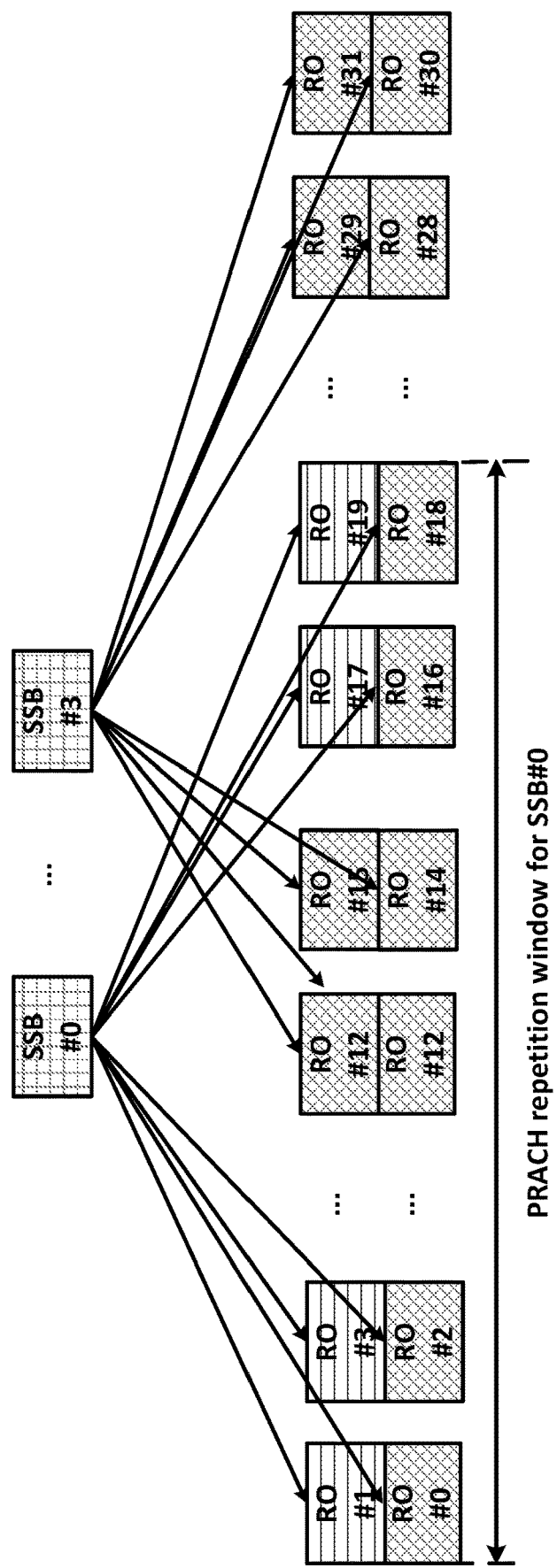
FIG. 7 illustrates another example of PRACH window determination for multiple PRACH transmissions, in accordance with various embodiments.

FIG. 7 illustrates one example of PRACH repetition window determination for multiple PRACH transmissions. In the example, 2 valid PRACH occasions are multiplexed in a FDM manner. 8 SSBs are configured and each SSB is associated with 4 valid PRACH occasions. the PRACH repetition window size is 4 PRACH occasions. Based on the PRACH occasion determination rule for this option, UE first randomly selects one PRACH occasion from two FDM'ed PRACH occasions. Further, PRACH occasions with same frequency resource are determined for multiple PRACH transmissions. In this case, PRACH repetition window for SSB #0 is determined as RO #1, #3, #17 and #19 for the first set of PRACH occasions.

In another embodiment, for multiple PRACH transmission, the number of repetitions for multiple PRACH transmissions is determined in accordance with a number N of SSB indexes associated with one PRACH occasion and the number of FDM'ed PRACH occasion.

In one option, the number of repetitions can be given by $$N_{PRACH}^{Repeat} = 1/(N \cdot N_{FDM})$$

Where $N_{PRACH}^{Repeat}$ is the number of repetitions, $N_{FDM}$ is the number of FDM'ed PRACH occasion, which is provided by msg1-FDM. In one example, assuming that N=⅛, e.g., one SSB is associated with 8 PRACH occasions, and $N_{FDM}$=2, e.g., two PRACH occasions are FDM'ed in frequency domain, then the number of repetitions can be determined as $N_{PRACH}^{Repeat}$=4.

In one option, a consecutive $N_{PRACH}^{Repeat}$ time-domain valid PRACH occasions associated with an SSB can be used for multiple PRACH transmissions or PRACH repetitions. Further, when more than one valid PRACH occasion that is associated with an SSB is multiplexed in a FDM manner, UE randomly selects one valid PRACH occasion corresponding to the first PRACH repetition. The UE selects the consecutive $N_{PRACH}^{Repeat}$ time-domain valid PRACH occasions with same frequency resource for the multiple PRACH transmissions or PRACH repetitions.

In another option, the number of repetitions $N_{PRACH}^{Repeat}$ can be separately configured for multiple PRACH transmissions. To ensure a consecutive $N_{PRACH}^{Repeat}$ time-domain valid PRACH occasions associated with an SSB, $N_{PRACH}^{Repeat} \leq 1/(N \cdot N_{FDM})$. In this case, the number of repetition groups associated with an SSB can be determined as $$N_{PRACH}^{Group} = \frac{1}{(N \cdot N_{FDM} \cdot N_{PRACH}^{Repeat})}.$$

In this case, different repetition groups of valid PRACH occasions are consecutive in time domain.

In some aspects, this option may be applied for the case when single PRACH transmission and multiple PRACH transmissions are configured with different PRACH occasions.

Figure 8:
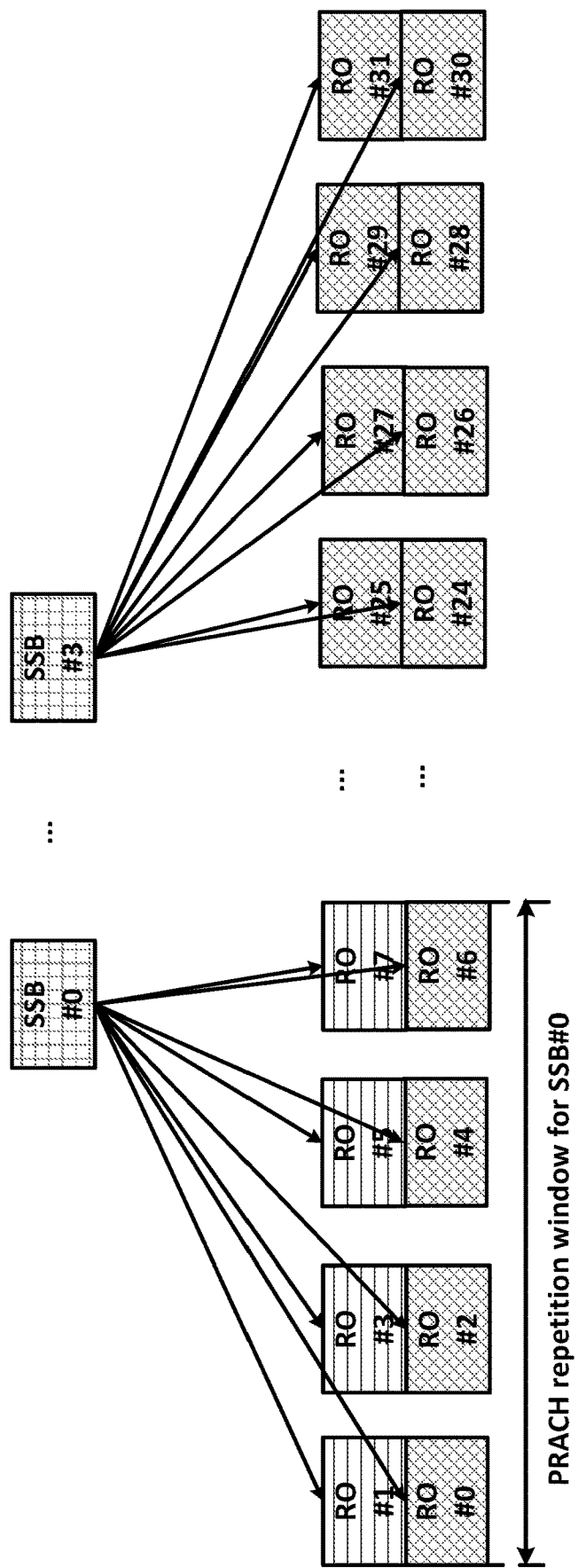
FIG. 8 illustrates another example of PRACH window determination for multiple PRACH transmissions, in accordance with various embodiments.

FIG. 8 illustrates one example of PRACH repetition window determination for multiple PRACH transmissions. In the example, 2 valid PRACH occasions are multiplexed in a FDM manner. 4 SSBs are configured and each SSB is associated with 8 valid PRACH occasions. Based on this option, UE selects second PRACH occasion among two FDM'ed PRACH occasions. The number of PRACH repetitions is 4 and PRACH repetition window for SSB #0 is determined as RO #1, #3, #5 and #7 for the first set of PRACH occasions.

Determination of the Association Period for Mapping SSB to PRACH Occasions

Embodiments directed to the determination of an association period for multiple PRACH transmissions are provided as follows:

In one embodiment, for multiple PRACH transmissions, the association period for mapping SSB to PRACH occasions can be determined based on a number $N_{PRACH}^{Repeat}$ of PRACH occasions, where $N_{PRACH}^{Repeat}$ is the number of PRACH occasions associated with an SSB for multiple PRACH transmissions.

In particular, an association period, starting from frame 0, for mapping SS/PBCH block indexes to $N_{PRACH}^{Repeat}$ PRACH occasions is the smallest value in the set determined by the PRACH configuration period according to Table 8.1-1 such that $N_{Tx}^{SSB}$ SS/PBCH block indexes are mapped at least once to the $N_{PRACH}^{Repeat}$ PRACH occasions within the association period, where a UE obtains $N_{Tx}^{SSB}$ from the value of ssb-PositionsInBurst in SIB1 or in ServingCellConfigCommon. If after an integer number of SS/PBCH block indexes to $N_{PRACH}^{Repeat}$ PRACH occasions mapping cycles within the association period there is a set of $N_{PRACH}^{Repeat}$ PRACH occasions or PRACH preambles that are not mapped to $N_{Tx}^{SSB}$ SS/PBCH block indexes, no SS/PBCH block indexes are mapped to the set of $N_{PRACH}^{Repeat}$ PRACH occasions or PRACH preambles.

In another embodiment, an association pattern period includes one or more association periods and is determined so that a pattern between $N_{PRACH}^{Repeat}$ PRACH occasions and SS/PBCH block indexes repeats at most every 160 msec. $N_{PRACH}^{Repeat}$ PRACH occasions not associated with SS/PBCH block indexes after an integer number of association periods, if any, are not used for PRACH transmissions.

In another embodiment, for multiple PRACH transmissions, an association pattern period includes one or more association periods and is determined so that a pattern between PRACH occasions and SS/PBCH block indexes repeats at most every $160 \cdot N_{PRACH}^{Repeat}$ msec.

In another embodiment, for multiple PRACH transmissions, the association period for SSB to PRACH occasion can be determined in accordance with the PRACH configuration period and the number of repetitions for multiple PRACH transmission. In particular, the mapping between PRACH configuration period and SS/PBCH block to PRACH occasion association period can be updated in Table 1:

TABLE 1

Mapping between PRACH configuration period and SS/PBCH block to PRACH occasion association period

| PRACH configuration period (msec) | Association period (number of PRACH configuration periods multiplied by number of repetitions) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Systems and Implementations

Figure 9:
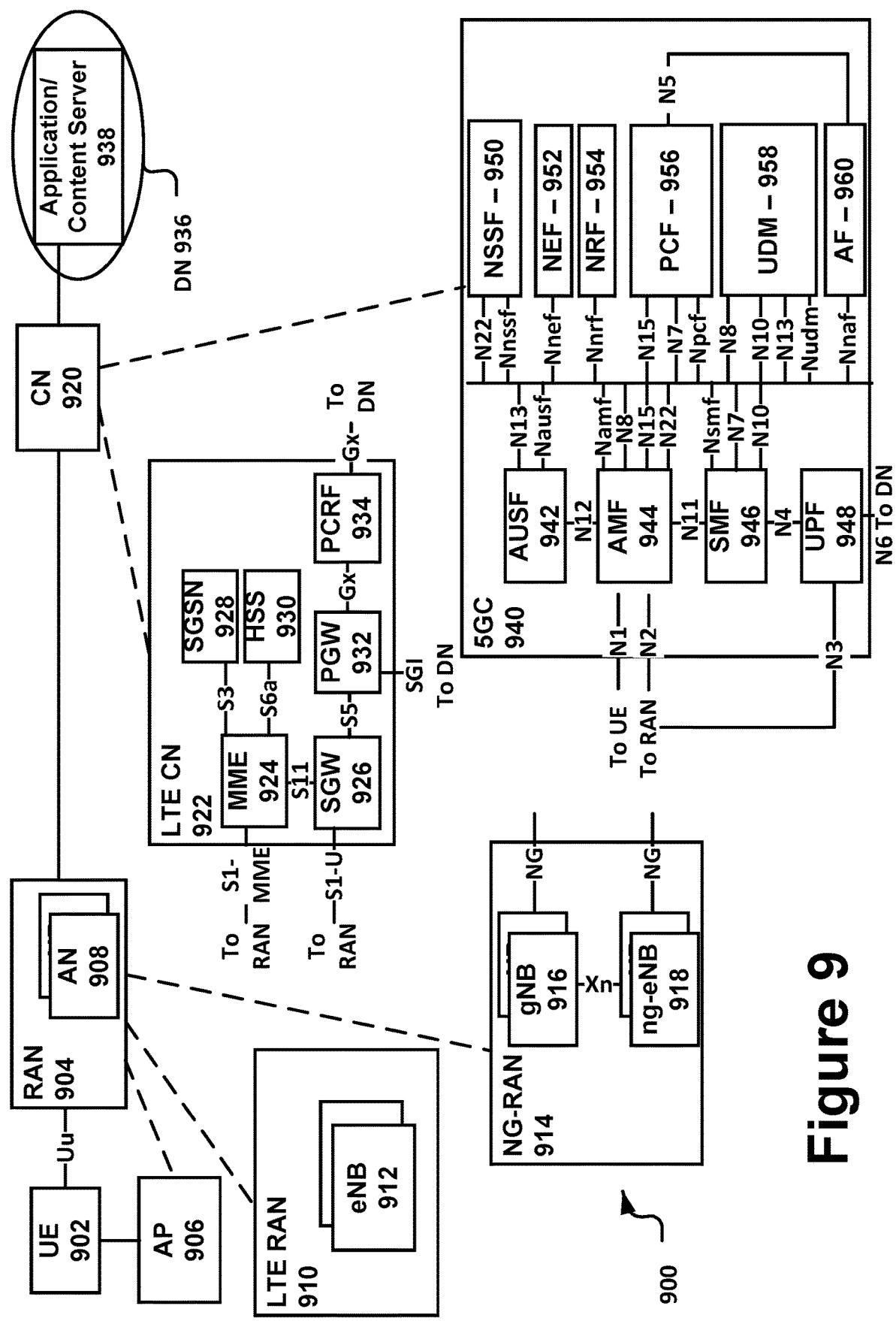
FIG. 9 schematically illustrates a wireless network in accordance with various embodiments.
Figure 10:
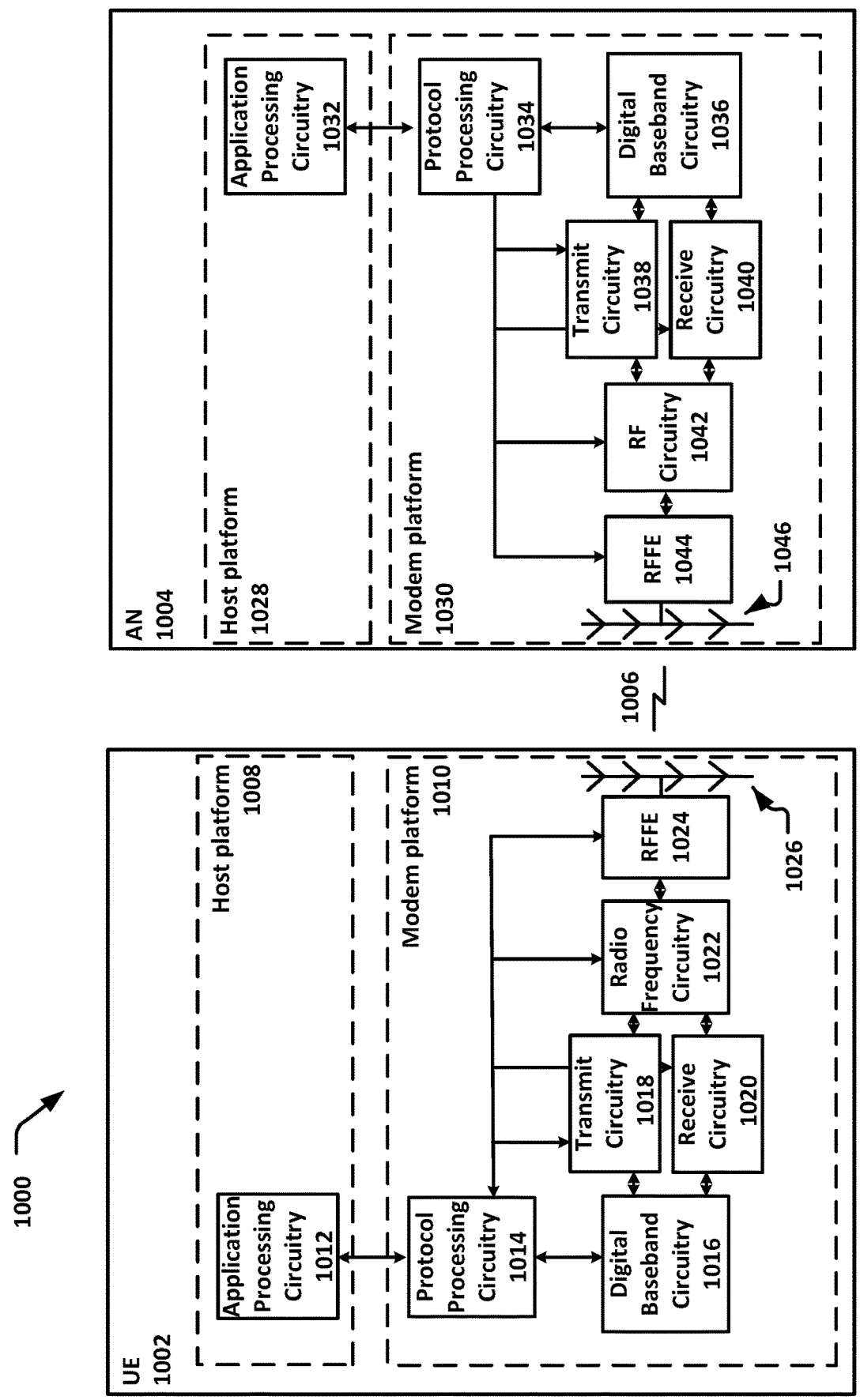
FIG. 10 schematically illustrates components of a wireless network in accordance with various embodiments.
Figure 11:
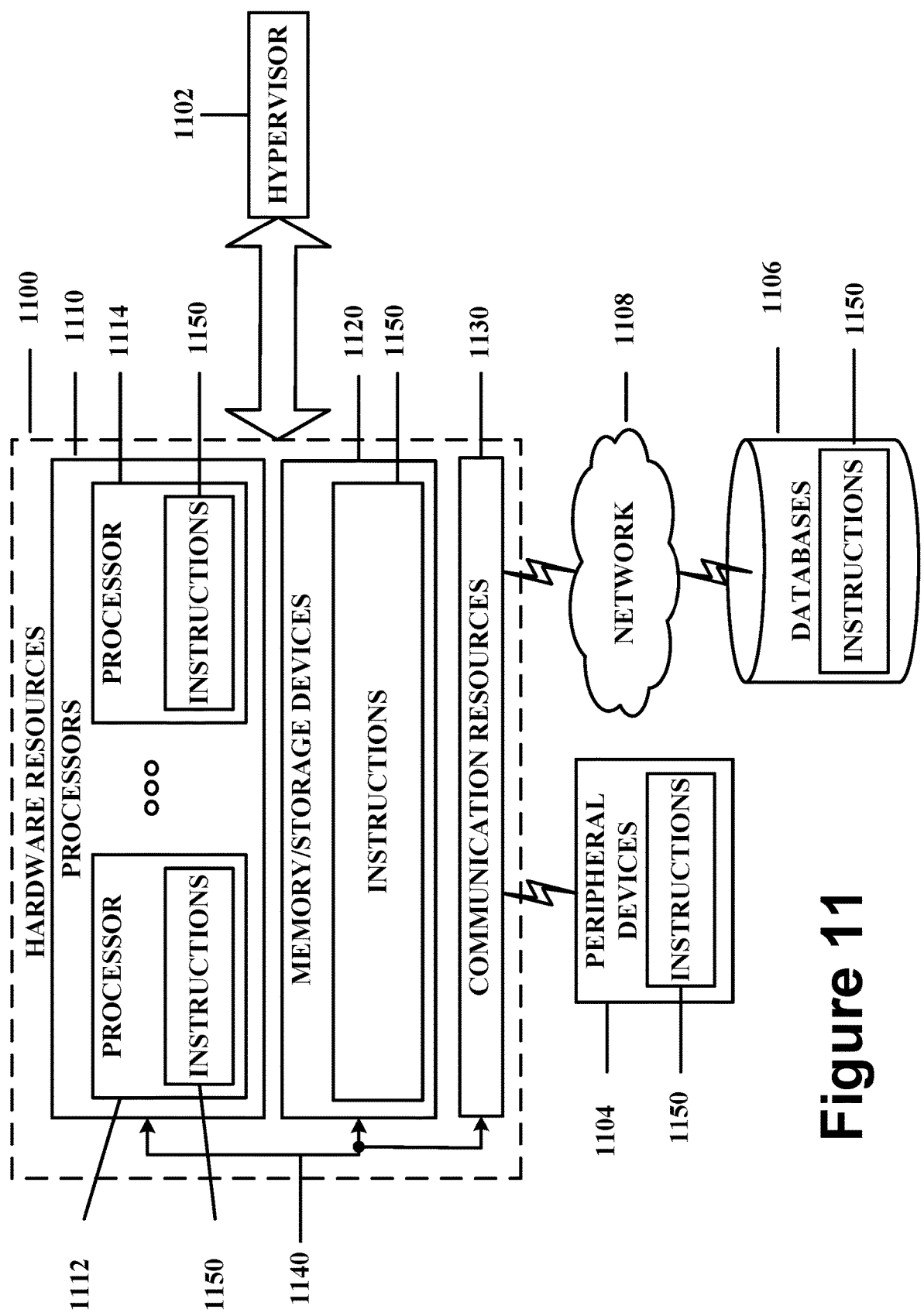
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 9-11 illustrate various systems, devices, and components that may implement aspects of disclosed embodiments.

FIG. 9 illustrates a network 900 in accordance with various embodiments. The network 900 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 900 may include a UE 902, which may include any mobile or non-mobile computing device designed to communicate with a RAN 904 via an over-the-air connection. The UE 902 may be communicatively coupled with the RAN 904 by a Uu interface. The UE 902 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 900 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 902 may additionally communicate with an AP 906 via an over-the-air connection. The AP 906 may manage a WLAN connection, which may serve to offload some/all network traffic from the RAN 904. The connection between the UE 902 and the AP 906 may be consistent with any IEEE 802.11 protocol, wherein the AP 906 could be a wireless fidelity (Wi-Fi®) router. In some embodiments, the UE 902, RAN 904, and AP 906 may utilize cellular-WLAN aggregation (for example, LWA/LWIP). Cellular-WLAN aggregation may involve the UE 902 being configured by the RAN 904 to utilize both cellular radio resources and WLAN resources.

The RAN 904 may include one or more access nodes, for example, AN 908. AN 908 may terminate air-interface protocols for the UE 902 by providing access stratum protocols including RRC, PDCP, RLC, MAC, and L1 protocols. In this manner, the AN 908 may enable data/voice connectivity between CN 920 and the UE 902. In some embodiments, the AN 908 may be implemented in a discrete device or as one or more software entities running on server computers as part of, for example, a virtual network, which may be referred to as a CRAN or virtual baseband unit pool. The AN 908 be referred to as a BS, gNB, RAN node, eNB, ng-eNB, NodeB, RSU, TRxP, TRP, etc. The AN 908 may be a macrocell base station or a low power base station for providing femtocells, picocells or other like cells having smaller coverage areas, smaller user capacity, or higher bandwidth compared to macrocells.

In embodiments in which the RAN 904 includes a plurality of ANs, they may be coupled with one another via an X2 interface (if the RAN 904 is an LTE RAN) or an Xn interface (if the RAN 904 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 904 may each manage one or more cells, cell groups, component carriers, etc. to provide the UE 902 with an air interface for network access. The UE 902 may be simultaneously connected with a plurality of cells provided by the same or different ANs of the RAN 904. For example, the UE 902 and RAN 904 may use carrier aggregation to allow the UE 902 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 904 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 902 or AN 908 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 904 may be an LTE RAN 910 with eNBs, for example, eNB 912. The LTE RAN 910 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 904 may be an NG-RAN 914 with gNBs, for example, gNB 916, or ng-eNBs, for example, ng-eNB 918. The gNB 916 may connect with 5G-enabled UEs using a 5G NR interface. The gNB 916 may connect with a 5G core through an NG interface, which may include an N2 interface or an N3 interface. The ng-eNB 918 may also connect with the 5G core through an NG interface, but may connect with a UE via an LTE air interface. The gNB 916 and the ng-eNB 918 may connect with each other over an Xn interface.

In some embodiments, the NG interface may be split into two parts, an NG user plane (NG-U) interface, which carries traffic data between the nodes of the NG-RAN 914 and a UPF 948 (e.g., N3 interface), and an NG control plane (NG-C) interface, which is a signaling interface between the nodes of the NG-RAN 914 and an AMF 944 (e.g., N2 interface).

The NG-RAN 914 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operate on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 902 can be configured with multiple BWPs where each BWP configuration has a different SCS. When a BWP change is indicated to the UE 902, the SCS of the transmission is changed as well. Another use case example of BWP is related to power saving. In particular, multiple BWPs can be configured for the UE 902 with different amount of frequency resources (for example, PRBs) to support data transmission under different traffic loading scenarios. A BWP containing a smaller number of PRBs can be used for data transmission with small traffic load while allowing power saving at the UE 902 and in some cases at the gNB 916. A BWP containing a larger number of PRBs can be used for scenarios with higher traffic load.

The RAN 904 is communicatively coupled to CN 920 that includes network elements to provide various functions to support data and telecommunications services to customers/subscribers (for example, users of UE 902). The components of the CN 920 may be implemented in one physical node or separate physical nodes. In some embodiments, NFV may be utilized to virtualize any or all of the functions provided by the network elements of the CN 920 onto physical compute/storage resources in servers, switches, etc. A logical instantiation of the CN 920 may be referred to as a network slice, and a logical instantiation of a portion of the CN 920 may be referred to as a network sub-slice.

In some embodiments, the CN 920 may be an LTE CN 922, which may also be referred to as an EPC. The LTE CN 922 may include MME 924, SGW 926, SGSN 928, HSS 930, PGW 932, and PCRF 934 coupled with one another over interfaces (or "reference points") as shown. Functions of the elements of the LTE CN 922 may be briefly introduced as follows.

The MME 924 may implement mobility management functions to track a current location of the UE 902 to facilitate paging, bearer activation/deactivation, handovers, gateway selection, authentication, etc.

The SGW 926 may terminate an Si interface toward the RAN and route data packets between the RAN and the LTE CN 922. The SGW 926 may be a local mobility anchor point for inter-RAN node handovers and also may provide an anchor for inter-3GPP mobility. Other responsibilities may include lawful intercept, charging, and some policy enforcement.

The SGSN 928 may track a location of the UE 902 and perform security functions and access control. In addition, the SGSN 928 may perform inter-EPC node signaling for mobility between different RAT networks; PDN and S-GW selection as specified by MME 924; MME selection for handovers; etc. The S3 reference point between the MIME 924 and the SGSN 928 may enable user and bearer information exchange for inter-3GPP access network mobility in idle/active states.

The HSS 930 may include a database for network users, including subscription-related information to support the network entities' handling of communication sessions. The HSS 930 can provide support for routing/roaming, authentication, authorization, naming/addressing resolution, location dependencies, etc. An S6a reference point between the HSS 930 and the MME 924 may enable transfer of subscription and authentication data for authenticating/authorizing user access to the LTE CN 920.

The PGW 932 may terminate an SGi interface toward a data network (DN) 936 that may include an application/content server 938. The PGW 932 may route data packets between the LTE CN 922 and the data network 936. The PGW 932 may be coupled with the SGW 926 by an S5 reference point to facilitate user plane tunneling and tunnel management. The PGW 932 may further include a node for policy enforcement and charging data collection (for example, PCEF). Additionally, the SGi reference point between the PGW 932 and the data network 936 may be an operator external public, a private PDN, or an intra-operator packet data network, for example, for provision of IMS services. The PGW 932 may be coupled with a PCRF 934 via a Gx reference point.

The PCRF 934 is the policy and charging control element of the LTE CN 922. The PCRF 934 may be communicatively coupled to the app/content server 938 to determine appropriate QoS and charging parameters for service flows. The PCRF 932 may provision associated rules into a PCEF (via Gx reference point) with appropriate TFT and QCI.

In some embodiments, the CN 920 may be a 5GC 940. The 5GC 940 may include an AUSF 942, AMF 944, SMF 946, UPF 948, NSSF 950, NEF 952, NRF 954, PCF 956, UDM 958, and AF 960 coupled with one another over interfaces (or "reference points") as shown. Functions of the elements of the GC 940 may be briefly introduced as follows.

The AUSF 942 may store data for authentication of UE 902 and handle authentication-related functionality. The AUSF 942 may facilitate a common authentication framework for various access types. In addition to communicating with other elements of the GC 940 over reference points as shown, the AUSF 942 may exhibit an Nausf service-based interface.

The AMF 944 may allow other functions of the 5GC 940 to communicate with the UE 902 and the RAN 904 and to subscribe to notifications about mobility events with respect to the UE 902. The AMF 944 may be responsible for registration management (for example, for registering UE 902), connection management, reachability management, mobility management, lawful interception of AMF-related events, and access authentication and authorization. The AMF 944 may provide transport for SM messages between the UE 902 and the SMF 946, and act as a transparent proxy for routing SM messages. AMF 944 may also provide transport for SMS messages between UE 902 and an SMSF. AMF 944 may interact with the AUSF 942 and the UE 902 to perform various security anchor and context management functions. Furthermore, AMF 944 may be a termination point of a RAN CP interface, which may include or be an N2 reference point between the RAN 904 and the AMF 944; and the AMF 944 may be a termination point of NAS (N1) signaling, and perform NAS ciphering and integrity protection. AMF 944 may also support NAS signaling with the UE 902 over an N3 IWF interface.

The SMF 946 may be responsible for SM (for example, session establishment, tunnel management between UPF 948 and AN 908); UE IP address allocation and management (including optional authorization); selection and control of UP function; configuring traffic steering at UPF 948 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 944 over N2 to AN 908; and determining SSC mode of a session. SM may refer to management of a PDU session, and a PDU session or "session" may refer to a PDU connectivity service that provides or enables the exchange of PDUs between the UE 902 and the data network 936.

The UPF 948 may act as an anchor point for intra-RAT and inter-RAT mobility, an external PDU session point of interconnect to data network 936, and a branching point to support multi-homed PDU session. The UPF 948 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 948 may include an uplink classifier to support routing traffic flows to a data network.

The NSSF 950 may select a set of network slice instances serving the UE 902. The NSSF 950 may also determine allowed NSSAI and the mapping to the subscribed S-NS-SAIs, if needed. The NSSF 950 may also determine the AMF set to be used to serve the UE 902, or a list of candidate AMFs based on a suitable configuration and possibly by querying the NRF 954. The selection of a set of network slice instances for the UE 902 may be triggered by the AMF 944 with which the UE 902 is registered by interacting with the NSSF 950, which may lead to a change of AMF. The NSSF 950 may interact with the AMF 944 via an N22 reference point; and may communicate with another NSSF in a visited network via an N31 reference point (not shown). Additionally, the NSSF 950 may exhibit an Nnssf service-based interface.

The NEF 952 may securely expose services and capabilities provided by 3GPP network functions for third party, internal exposure/re-exposure, AFs (e.g., AF 960), edge computing or fog computing systems, etc. In such embodiments, the NEF 952 may authenticate, authorize, or throttle the AFs. NEF 952 may also translate information exchanged with the AF 960 and information exchanged with internal network functions. For example, the NEF 952 may translate between an AF-Service-Identifier and an internal 5GC information. NEF 952 may also receive information from other NFs based on exposed capabilities of other NFs. This information may be stored at the NEF 952 as structured data, or at a data storage NF using standardized interfaces. The stored information can then be re-exposed by the NEF 952 to other NFs and AFs, or used for other purposes such as analytics. Additionally, the NEF 952 may exhibit an Nnef service-based interface.

The NRF 954 may support service discovery functions, receive NF discovery requests from NF instances, and provide the information of the discovered NF instances to the NF instances. NRF 954 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 954 may exhibit the Nnrf service-based interface.

The PCF 956 may provide policy rules to control plane functions to enforce them, and may also support unified policy framework to govern network behavior. The PCF 956 may also implement a front end to access subscription information relevant for policy decisions in a UDR of the UDM 958. In addition to communicating with functions over reference points as shown, the PCF 956 exhibit an Npcf service-based interface.

The UDM 958 may handle subscription-related information to support the network entities' handling of communication sessions, and may store subscription data of UE 902. For example, subscription data may be communicated via an N8 reference point between the UDM 958 and the AMF 944. The UDM 958 may include two parts, an application front end and a UDR. The UDR may store subscription data and policy data for the UDM 958 and the PCF 956, and/or structured data for exposure and application data (including PFDs for application detection, application request information for multiple UEs 902) for the NEF 952. The Nudr service-based interface may be exhibited by the UDR 221 to allow the UDM 958, PCF 956, and NEF 952 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 958 may exhibit the Nudm service-based interface.

The AF 960 may provide application influence on traffic routing, provide access to NEF, and interact with the policy framework for policy control.

In some embodiments, the 5GC 940 may enable edge computing by selecting operator/3rd party services to be geographically close to a point that the UE 902 is attached to the network. This may reduce latency and load on the network. To provide edge-computing implementations, the 5GC 940 may select a UPF 948 close to the UE 902 and execute traffic steering from the UPF 948 to data network 936 via the N6 interface. This may be based on the UE subscription data, UE location, and information provided by the AF 960. In this way, the AF 960 may influence UPF (re)selection and traffic routing. Based on operator deployment, when AF 960 is considered to be a trusted entity, the network operator may permit AF 960 to interact directly with relevant NFs. Additionally, the AF 960 may exhibit an Naf service-based interface.

The data network 936 may represent various network operator services, Internet access, or third party services that may be provided by one or more servers including, for example, application/content server 938.

FIG. 10 schematically illustrates a wireless network 1000 in accordance with various embodiments. The wireless network 1000 may include a UE 1002 in wireless communication with an AN 1004. The UE 1002 and AN 1004 may be similar to, and substantially interchangeable with, like-named components described elsewhere herein.

The UE 1002 may be communicatively coupled with the AN 1004 via connection 1006. The connection 1006 is illustrated as an air interface to enable communicative coupling, and can be consistent with cellular communications protocols such as an LTE protocol or a 5G NR protocol operating at mmWave or sub-6 GHz frequencies.

The UE 1002 may include a host platform 1008 coupled with a modem platform 1010. The host platform 1008 may include application processing circuitry 1012, which may be coupled with protocol processing circuitry 1014 of the modem platform 1010. The application processing circuitry 1012 may run various applications for the UE 1002 that source/sink application data. The application processing circuitry 1012 may further implement one or more layer operations to transmit/receive application data to/from a data network. These layer operations may include transport (for example UDP) and Internet (for example, IP) operations.

The protocol processing circuitry 1014 may implement one or more of layer operations to facilitate transmission or reception of data over the connection 1006. The layer operations implemented by the protocol processing circuitry 1014 may include, for example, MAC, RLC, PDCP, RRC and NAS operations.

The modem platform 1010 may further include digital baseband circuitry 1016 that may implement one or more layer operations that are "below" layer operations performed by the protocol processing circuitry 1014 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1010 may further include transmit circuitry 1018, receive circuitry 1020, RF circuitry 1022, and RF front end (RFFE) 1024, which may include or connect to one or more antenna panels 1026. Briefly, the transmit circuitry 1018 may include a digital-to-analog converter, mixer, intermediate frequency (IF) components, etc.; the receive circuitry 1020 may include an analog-to-digital converter, mixer, IF components, etc.; the RF circuitry 1022 may include a low-noise amplifier, a power amplifier, power tracking components, etc.; RFFE 1024 may include filters (for example, surface/bulk acoustic wave filters), switches, antenna tuners, beamforming components (for example, phase-array antenna components), etc. The selection and arrangement of the components of the transmit circuitry 1018, receive circuitry 1020, RF circuitry 1022, RFFE 1024, and antenna panels 1026 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1014 may include one or more instances of control circuitry (not shown) to provide control functions for the transmit/receive components.

A UE reception may be established by and via the antenna panels 1026, RFFE 1024, RF circuitry 1022, receive circuitry 1020, digital baseband circuitry 1016, and protocol processing circuitry 1014. In some embodiments, the antenna panels 1026 may receive a transmission from the AN 1004 by receive-beamforming signals received by a plurality of antennas/antenna elements of the one or more antenna panels 1026.

A UE transmission may be established by and via the protocol processing circuitry 1014, digital baseband circuitry 1016, transmit circuitry 1018, RF circuitry 1022, RFFE 1024, and antenna panels 1026. In some embodiments, the transmit components of the UE 1004 may apply a spatial filter to the data to be transmitted to form a transmit beam emitted by the antenna elements of the antenna panels 1026.

Similar to the UE 1002, the AN 1004 may include a host platform 1028 coupled with a modem platform 1030. The host platform 1028 may include application processing circuitry 1032 coupled with protocol processing circuitry 1034 of the modem platform 1030. The modem platform may further include digital baseband circuitry 1036, transmit circuitry 1038, receive circuitry 1040, RF circuitry 1042, RFFE circuitry 1044, and antenna panels 1046. The components of the AN 1004 may be similar to and substantially interchangeable with like-named components of the UE 1002. In addition to performing data transmission/reception as described above, the components of the AN 1008 may perform various logical functions that include, for example, RNC functions such as radio bearer management, uplink and downlink dynamic radio resource management, and data packet scheduling.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140 or other interface circuitry. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processors 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface controllers, components, or other suitable devices to communicate with one or more peripheral devices 1104 or one or more databases 1106 or other network elements via a network 1108. For example, the communication resources 1130 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

EXAMPLE PROCEDURES

Figure 12:
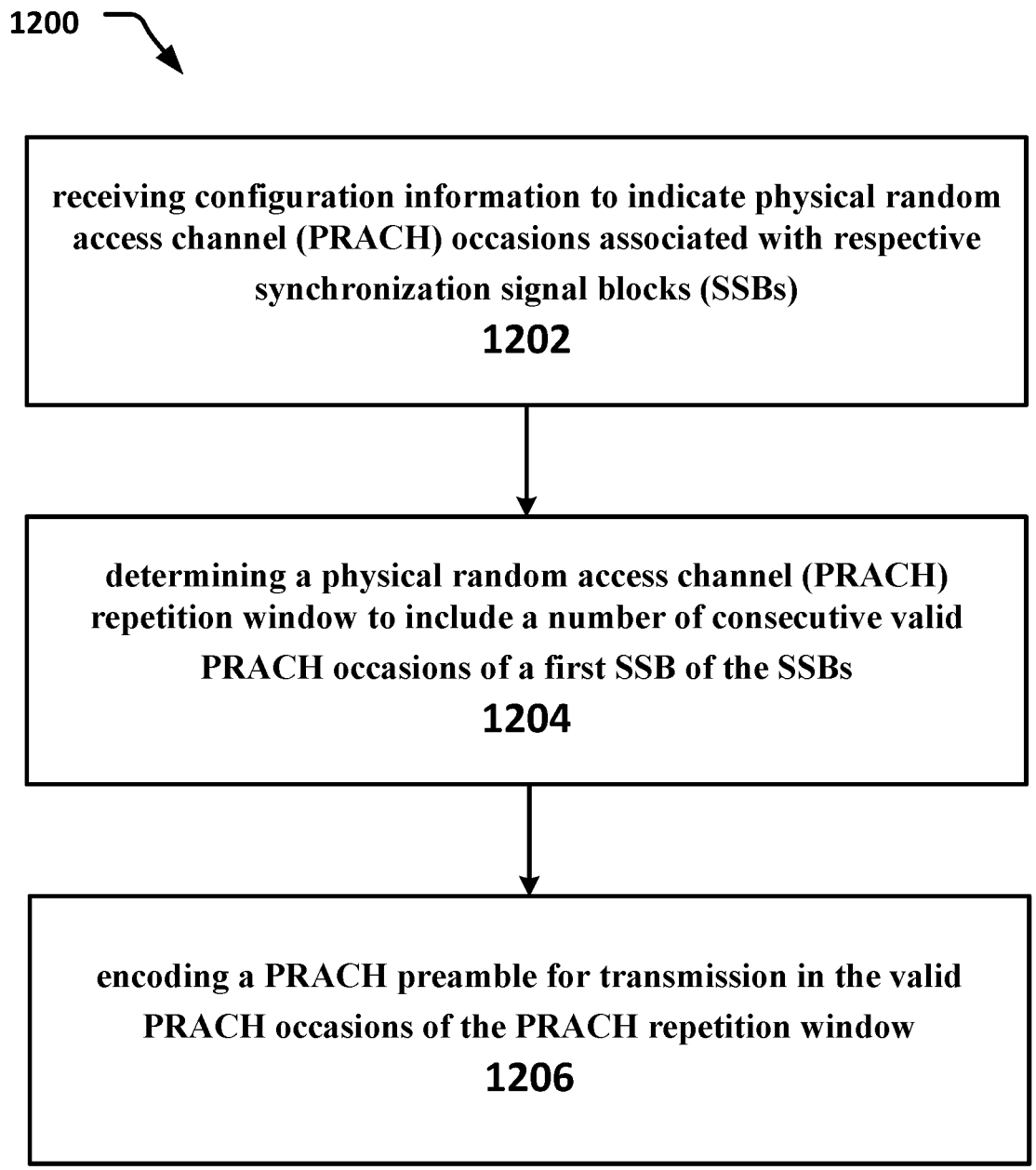
FIG. 12 depicts an example procedure for practicing the various embodiments discussed herein.

In some embodiments, the electronic device(s), network(s), system(s), chip(s) or component(s), or portions or implementations thereof, of FIGS. 9-11, or some other figure herein, may be configured to perform one or more processes, techniques, or methods as described herein, or portions thereof. One such process 1200 is depicted in FIG. 12. In some embodiments, the process 1200 may be performed by a UE or a portion thereof. At 1202, the process 1200 may include receiving configuration information to indicate physical random access channel (PRACH) occasions associated with respective synchronization signal blocks (SSBs). At 1204, the process 1200 may further include determining a physical random access channel (PRACH) repetition window to include a number of consecutive valid PRACH occasions of a first SSB of the SSBs. At 1206, the process 1200 may further include encoding a PRACH preamble for transmission in the valid PRACH occasions of the PRACH repetition window.

FIG. 13 illustrates another example process 1300 in accordance with various embodiments. In some embodiments, the process 1300 may be performed by a gNB or a portion thereof. At 1302, the process 1300 may include encode, for transmission to a user equipment (UE), configuration information to indicate physical random access channel (PRACH) occasions associated with respective synchronization signal blocks (SSBs). At 1304, the process 1300 may further include determining a physical random access channel (PRACH) repetition window to include a number of consecutive valid PRACH occasions of a first SSB of the SSBs. At 1306, the process 1300 may further include receiving a PRACH preamble in the valid PRACH occasions of the PRACH repetition window.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include one or more non-transitory computer-readable media (NTCRM) having instructions, stored thereon, that when executed by one or more processors of a user equipment (UE) configure the UE to: receive configuration information to indicate physical random access channel (PRACH) occasions associated with respective synchronization signal blocks (SSBs); determine a physical random access channel (PRACH) repetition window to include a number of consecutive valid PRACH occasions of a first SSB of the SSBs; and encode a PRACH preamble for transmission in the valid PRACH occasions of the PRACH repetition window.

Example A2 may include the one or more NTCRM of example A1, wherein one or more PRACH occasions of a second SSB of the SSBs are between the valid PRACH occasions of the PRACH repetition window.

Example A3 may include the one or more NTCRM of example A1, wherein the instructions, when executed, are further to configure the UE to decode an indication of the number of PRACH occasions in the PRACH repetition window.

Example A4 may include the one or more NTCRM of example A1, wherein the instructions, when executed, are further to configure the UE to identify the valid PRACH occasions based on one or more validation rules.

Example A5 may include the one or more NTCRM of example A1, wherein a gap between two of the valid PRACH occasions of the first SSB is determined based on a number of valid PRACH occasions that are mapped to all of the SSBs.

Example A6 may include the one or more NTCRM of example A1, wherein the PRACH repetition window is a first PRACH repetition window of a plurality of PRACH repetition windows associated with the respective SSBs.

Example A7 may include the one or more NTCRM of example A6, wherein the first PRACH repetition window starts with a frame 0.

Example A8 may include the one or more NTCRM of example A1, wherein the instructions, when executed, are further to configure the UE to receive an indication of an association period for determination of the PRACH repetition window.

Example A9 may include the one or more NTCRM of example A1, wherein the consecutive valid PRACH occasions associated with the first SSB are PRACH occasions that are multiplexed in a time domain or a frequency domain.

Example A10 may include one or more non-transitory computer-readable media (NTCRM) having instructions, stored thereon, that when executed by one or more processors of a next generation Node B (gNB) configure the gNB to: encode, for transmission to a user equipment (UE), configuration information to indicate physical random access channel (PRACH) occasions associated with respective synchronization signal blocks (SSBs); determine a physical random access channel (PRACH) repetition window to include a number of consecutive valid PRACH occasions of a first SSB of the SSBs; and receive a PRACH preamble in the valid PRACH occasions of the PRACH repetition window.

Example A11 may include the one or more NTCRM of example A10, wherein one or more PRACH occasions of a second SSB of the SSBs are between the valid PRACH occasions of the PRACH repetition window.

Example A12 may include the one or more NTCRM of example A10, wherein the instructions, when executed, are further to configure the gNB to encode, for transmission to the UE, an indication of the number of PRACH occasions in the PRACH repetition window.

Example A13 may include the one or more NTCRM of example A10, wherein the valid PRACH occasions are based on one or more validation rules.

Example A14 may include the one or more NTCRM of example A10, wherein a gap between two of the valid PRACH occasions of the first SSB is determined based on a number of valid PRACH occasions that are mapped to all of the SSBs.

Example A15 may include the one or more NTCRM of example A10, wherein the PRACH repetition window is a first PRACH repetition window of a plurality of PRACH repetition windows associated with the respective SSBs.

Example A16 may include the one or more NTCRM of example A15, wherein the first PRACH repetition window starts with a frame 0.

Example A17 may include the one or more NTCRM of example A10, wherein the instructions, when executed, are further to configure the gNB to encode, for transmission to the UE, an indication of an association period for determination of the PRACH repetition window.

Example A18 may include the one or more NTCRM of example A10, wherein the consecutive valid PRACH occasions associated with the first SSB are PRACH occasions that are multiplexed in a time domain or a frequency domain.

Example B1 may include a method of wireless communication for a fifth generation (5G) or new radio (NR) system, comprising: configuring, by a next-generation NodeB (gNB), a number of repetitions for a physical random access channel (PRACH); and transmitting, by a UE, the PRACH preamble with repetitions on different PRACH occasions associated with a synchronization signal block (SSB) in accordance with the number of repetitions.

Example B2 may include the method of example B1 or some other example herein, wherein PRACH repetition window is determined in accordance with a number of consecutive valid PRACH occasions associated with an SSB .

Example B3 may include the method of example B2 or some other example herein, wherein the consecutive valid PRACH occasions associated with an SSB are the PRACH occasions that are multiplexed in the time domain.

Example B4 may include the method of example B2 or some other example herein, wherein the consecutive valid PRACH occasions associated with an SSB are the PRACH occasions that can be multiplexed either in the time domain or in the frequency domain or both.

Example B5 may include the method of example B1 or some other example herein, wherein for multiple PRACH transmissions, PRACH repetition window is determined in accordance with a number of consecutive valid PRACH occasions.

Example B6 may include the method of example B5 or some there example herein, wherein the consecutive valid PRACH occasions are the PRACH occasions that are multiplexed in the time domain.

Example B7 may include the method of example B5 or some other example herein, wherein the consecutive valid PRACH occasions are the PRACH occasions that can be multiplexed either in the time domain or in the frequency domain or both.

Example B8 may include the method of example B1 or some other example herein, wherein for multiple PRACH transmissions, PRACH repetition window is determined in accordance with a number of consecutive configured PRACH occasions; wherein after the determination of PRACH repetition window, validation of PRACH occasions is performed based on the validation rule Example B9 may include the method of example B1 or some other example herein, wherein within a PRACH repetition window, only when all PRACH occasions for PRACH transmission are valid, then PRACH repetitions can be transmitted in the PRACH repetition window.

Example B10 may include the method of example B1 or some other example herein, wherein the first PRACH repetition window may start from 0, or align with the starting position of an association period or an association pattern period.

Example B11 may include the method of example B1 or some other example herein, wherein for multiple PRACH transmissions, association period for mapping SSB to PRACH occasions can be determined based on a number $N_{PRACH}^{Repeat}$ of PRACH occasions, where $N_{PRACH}^{Repeat}$ is the number of PRACH occasions associated with an SSB for multiple PRACH transmissions.

Example B12 may include the method of example B1 or some other example herein, wherein an association pattern period includes one or more association periods and is determined so that a pattern between $N_{PRACH}^{Repeat}$ PRACH occasions and SS/PBCH block indexes repeats at most every 160 msec. $N_{PRACH}^{Repeat}$ PRACH occasions not associated with SS/PBCH block indexes after an integer number of association periods, if any, are not used for PRACH transmissions.

Example B13 may include the method of example B1 or some other example herein, wherein the first PRACH repetition window starts from the frame 0; wherein the PRACH repetition window is determined in accordance with a number of non-consecutive valid PRACH occasions Example B14 may include the method of example B1 or some other example herein, wherein when more than one valid PRACH occasion that is associated with an SSB is multiplexed in a frequency division multiplexing (FDM) manner, UE randomly selects one valid PRACH occasion corresponding to the first PRACH repetition; Otherwise, UE selects one valid PRACH occasion corresponding to the first PRACH repetition.

Example B15 may include the method of example B1 or some other example herein, wherein UE continues to determine a first set of valid PRACH occasions for multiple PRACH transmission for the first set of PRACH repetitions, where the set of valid PRACH occasions are associated with the same SSB and have the same frequency resource with the selected valid PRACH occasion in the first step, until the number of determined valid PRACH occasions is equal to the number of repetitions for multiple PRACH transmissions Example B16 may include the method of example B1 or some other example herein, wherein the set of PRACH occasions may be determined within an association period or an association pattern period or 160 ms.

Example B17 may include the method of example B1 or some other example herein, wherein the set of valid PRACH occasions for multiple PRACH transmission may be determined within a value in accordance with the number of repetitions or maximum number of repetitions configured for multiple PRACH transmission.

Example B18 may include the method of example B1 or some other example herein, wherein multiple PRACH transmission, the number of repetitions for multiple PRACH transmissions is determined in accordance with a number N of SSB indexes associated with one PRACH occasion and the number of FDM'ed PRACH occasion.

Example B19 may include the method of example B1 or some other example herein, wherein for multiple PRACH transmissions, the association period for SSB to PRACH occasion can be determined in accordance with the PRACH configuration period and the number of repetitions for multiple PRACH transmission Example B20 includes a method comprising: determining physical random access channel (PRACH) repetition window configuration information for a plurality of short-format PRACH transmissions; and encoding a message for transmission to a user equipment (UE) that includes the PRACH repetition window configuration information.

Example B20a includes the method of example 2B0 or some other example herein, wherein the PRACH repetition window configuration information includes an indication of a first PRACH repetition window starting from frame 0, and wherein the first PRACH repetition window is determined in accordance with a number of non-consecutive valid PRACH occasions.

Example B20b includes the method of example B20 or some other example herein, wherein the PRACH repetition window configuration information includes an indication of more than one valid PRACH occasion that is associated with an SSB that is multiplexed in a frequency division multiplexing (FDM) manner.

Example B20c includes the method of example B20 or some other example herein, wherein the PRACH repetition window configuration information includes an indication of a set of PRACH occasions determined within an association period or an association pattern period or 160 ms.

Example B20d includes the method of example B20 or some other example herein, wherein the PRACH repetition window configuration information includes an indication of a set of valid PRACH occasions for multiple PRACH transmission determined within a value in accordance with a number of repetitions or maximum number of repetitions configured for multiple PRACH transmissions.

Example B20e includes the method of example B20 or some other example herein, wherein the PRACH repetition window configuration information includes an indication of a number of repetitions for multiple PRACH transmissions that are determined in accordance with a number N of SSB indexes associated with one PRACH occasion and a number of FDM'ed PRACH occasions.

Example B20f includes the method of example B20 or some other example herein, wherein the PRACH repetition window configuration information includes an indication of an association period for SSB to PRACH occasions determined in accordance with a PRACH configuration period and a number of repetitions for multiple PRACH transmissions.

Example B21 includes the method of example B20 or some other example herein, wherein the PRACH repetition window configuration information includes an indication of a PRACH repetition window that is associated with a synchronization signal block (SSB).

Example B22 includes the method of example B21 or some other example herein, wherein the PRACH repetition window is associated with a number of consecutive valid PRACH occasions associated with the SSB.

Example B23 includes the method of example B22 or some other example herein, wherein the consecutive valid PRACH occasions associated with an SSB are PRACH occasions that are multiplexed in a time domain.

Example B24 includes the method of example B22 or some other example herein, wherein the consecutive valid PRACH occasions associated with an SSB are PRACH occasions that are multiplexed in a frequency domain.

Example B25 includes the method of example B22 or some other example herein, wherein the consecutive valid PRACH occasions associated with an SSB are PRACH occasions that are multiplexed in both a time domain and a frequency domain.

Example B25a includes the method of any of examples B22-B25 or some other example herein, wherein the PRACH repetition window configuration information includes an indication of an association period for mapping synchronization signal (SS) or physical broadcast channel (PBCH) block indexes to PRACH occasions.

Example B26 includes the method of example B20 or some other example herein, wherein the PRACH repetition window configuration information includes an indication of a PRACH repetition window that is determined in accordance with a number of consecutive valid PRACH occasions.

Example B27 includes the method of example B26 or some other example herein, wherein the consecutive valid PRACH occasions are PRACH occasions that are multiplexed in a time domain.

Example B28 includes the method of example B26 or some other example herein, wherein the consecutive valid PRACH occasions are PRACH occasions that are multiplexed in a frequency domain.

Example B29 includes the method of example B26 or some other example herein, wherein the consecutive valid PRACH occasions are PRACH occasions that are multiplexed in both a time domain and a frequency domain.

Example B30 includes the method of example B20 or some other example herein, wherein the PRACH repetition window configuration information includes an indication of a PRACH repetition window that is determined in accordance with a number of consecutive configured PRACH occasions.

Example B31 includes the method of example B30 or some other example herein, wherein the consecutive configured PRACH occasions are PRACH occasions that are multiplexed in a time domain.

Example B32 includes the method of example B30 or some other example herein, wherein the consecutive configured PRACH occasions are PRACH occasions that are multiplexed in a frequency domain.

Example B33 includes the method of example B30 or some other example herein, wherein the consecutive configured PRACH occasions are PRACH occasions that are multiplexed in both a time domain and a frequency domain.

Example B34 includes the method of any of examples B20-B33 or some other example herein, wherein the method is performed by a next-generation NodeB (gNB) or portion thereof.

Example B35 includes a method of a user equipment (UE) comprising: receiving a configuration message that includes physical random access channel (PRACH) repetition window configuration information for a plurality of short-format PRACH transmissions; and transmitting the plurality of short-format PRACH transmissions based on the PRACH repetition window configuration information.

Example B35a includes the method of example B35 or some other example herein, wherein the PRACH repetition window configuration information includes an indication of a first PRACH repetition window starting from frame 0, and wherein the first PRACH repetition window is determined in accordance with a number of non-consecutive valid PRACH occasions.

Example B35b includes the method of example B35 or some other example herein, wherein the PRACH repetition window configuration information includes an indication of more than one valid PRACH occasion that is associated with an SSB that is multiplexed in a frequency division multiplexing (FDM) manner.

Example B35c includes the method of example B35 or some other example herein, wherein the PRACH repetition window configuration information includes an indication of a set of PRACH occasions determined within an association period or an association pattern period or Example B35d includes the method of example B35 or some other example herein, wherein the PRACH repetition window configuration information includes an indication of a set of valid PRACH occasions for multiple PRACH transmission determined within a value in accordance with a number of repetitions or maximum number of repetitions configured for multiple PRACH transmissions.

Example B35e includes the method of example B35 or some other example herein, wherein the PRACH repetition window configuration information includes an indication of a number of repetitions for multiple PRACH transmissions that are determined in accordance with a number N of SSB indexes associated with one PRACH occasion and a number of FDM'ed PRACH occasions.

Example B35f includes the method of example B35 or some other example herein, wherein the PRACH repetition window configuration information includes an indication of an association period for SSB to PRACH occasions determined in accordance with a PRACH configuration period and a number of repetitions for multiple PRACH transmissions.

Example B36 includes the method of example B35 or some other example herein, wherein the PRACH repetition window configuration information includes an indication of a PRACH repetition window that is associated with a synchronization signal block (SSB).

Example B37 includes the method of example B36 or some other example herein, wherein the PRACH repetition window is associated with a number of consecutive valid PRACH occasions associated with the SSB.

Example B38 includes the method of example B37 or some other example herein, wherein the consecutive valid PRACH occasions associated with an SSB are PRACH occasions that are multiplexed in a time domain.

Example B39 includes the method of example B37 or some other example herein, wherein the consecutive valid PRACH occasions associated with an SSB are PRACH occasions that are multiplexed in a frequency domain.

Example B40 includes the method of example B37 or some other example herein, wherein the consecutive valid PRACH occasions associated with an SSB are PRACH occasions that are multiplexed in both a time domain and a frequency domain.

Example B40a includes the method of any of examples B35-B40 or some other example herein, wherein the PRACH repetition window configuration information includes an indication of an association period for mapping synchronization signal (SS) or physical broadcast channel (PBCH) block indexes to PRACH occasions.

Example B40b includes the method of example B40a or some other example herein, further comprising skipping PRACH occasions in the same time instance for association with an SSB to determine the PRACH repetition window and transmitting different PRACH preambles using one or more transmit (Tx) beams for PRACH occasions associated with an SSB that are multiplexed in a time division multiplexing (TDM) manner.

Example B41 includes the method of example B35 or some other example herein, wherein the PRACH repetition window configuration information includes an indication of a PRACH repetition window that is determined in accordance with a number of consecutive valid PRACH occasions.

Example B42 includes the method of example B41 or some other example herein, wherein the consecutive valid PRACH occasions are PRACH occasions that are multiplexed in a time domain.

Example B43 includes the method of example B41 or some other example herein, wherein the consecutive valid PRACH occasions are PRACH occasions that are multiplexed in a frequency domain.

Example B44 includes the method of example B41 or some other example herein, wherein the consecutive valid PRACH occasions are PRACH occasions that are multiplexed in both a time domain and a frequency domain.

Example B45 includes the method of example B35 or some other example herein, wherein the PRACH repetition window configuration information includes an indication of a PRACH repetition window that is determined in accordance with a number of consecutive configured PRACH occasions.

Example B46 includes the method of example B45 or some other example herein, wherein the consecutive configured PRACH occasions are PRACH occasions that are multiplexed in a time domain.

Example B47 includes the method of example B45 or some other example herein, wherein the consecutive configured PRACH occasions are PRACH occasions that are multiplexed in a frequency domain.

Example B48 includes the method of example B45 or some other example herein, wherein the consecutive configured PRACH occasions are PRACH occasions that are multiplexed in both a time domain and a frequency domain.

Example Z01 may include an apparatus comprising means to perform one or more elements of a method described in or related to any of examples A1-A18, B1-B48, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A18, B1-B48, or any other method or process described herein.

Example Z03 may include an apparatus comprising logic, modules, or circuitry to perform one or more elements of a method described in or related to any of examples A1-A18, B1-B48, or any other method or process described herein.

Example Z04 may include a method, technique, or process as described in or related to any of examples A1-A18, B1-B48, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A18, B1-B48, or portions thereof.

Example Z06 may include a signal as described in or related to any of examples A1-A18, B1-B48, or portions or parts thereof.

Example Z07 may include a datagram, packet, frame, segment, protocol data unit (PDU), or message as described in or related to any of examples A1-A18, B1-B48, or portions or parts thereof, or otherwise described in the present disclosure.

Example Z08 may include a signal encoded with data as described in or related to any of examples A1-A18, B1-B48, or portions or parts thereof, or otherwise described in the present disclosure.

Example Z09 may include a signal encoded with a datagram, packet, frame, segment, protocol data unit (PDU), or message as described in or related to any of examples A1-A18, B1-B48, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A18, B1-B48, or portions thereof.

Example Z11 may include a computer program comprising instructions, wherein execution of the program by a processing element is to cause the processing element to carry out the method, techniques, or process as described in or related to any of examples A1-A18, B1-B48, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| 3GPP | Third Generation Partnership Project | ARP | Allocation and Retention Priority | C-RNTI | Cell Radio Network Temporary Identity |
|---|---|---|---|---|---|
| 4G | Fourth Generation | ARQ | Automatic Repeat Request | CA | Carrier Aggregation, Certification Authority |
| 5G | Fifth Generation | AS | Access Stratum | | |
| 5GC | 5G Core network | ASP | Application Service Provider | CAPEX | CAPital Expenditure |
| AC | Application Client | ASN.1 | Abstract Syntax Notation One | CBD | Candidate Beam Detection |
| ACR | Application Context Relocation | AUSF | Authentication Server Function | CBRA | Contention Based Random Access |
| ACK | Acknowledgement | AWGN | Additive White Gaussian Noise | CC | Component Carrier, Country Code, Cryptographic Checksum |
| ACID | Application Client Identification | BAP | Backhaul Adaptation Protocol | | |
| AF | Application Function | BCH | Broadcast Channel | | |
| AM | Acknowledged Mode | BER | Bit Error Ratio | CCA | Clear Channel Assessment |
| AMBR | Aggregate Maximum Bit Rate | BFD | Beam Failure Detection | CCE | Control Channel Element |
| AMF | Access and Mobility Management Function | BLER | Block Error Rate | CCCH | Common Control Channel |
| AN | Access Network | BPSK | Binary Phase Shift Keying | | |
| ANR | Automatic Neighbour Relation | BRAS | Broadband Remote Access Server | CE | Coverage Enhancement |
| AOA | Angle of Arrival | BSS | Business Support System | CDM | Content Delivery Network |
| AP | Application Protocol, Antenna Port, Access Point | BS | Base Station | CDMA | Code-Division Multiple Access |
| | | BSR | Buffer Status Report | | |
| | | BW | Bandwidth | | |
| API | Application Programming Interface | BWP | Bandwidth Part | CDR | Charging Data Request |
| | | COTS | Commercial Off-The-Shelf | | |
| APN | Access Point Name | | | CSCF | call session control function |
| CDR | Charging Data Response | CP | Control Plane, Cyclic Prefix, Connection Point | CSAR | Cloud Service Archive |
| CFRA | Contention Free Random Access | CPD | Connection Point Descriptor | CSI | Channel-State Information |
| CG | Cell Group | | | | |

-continued

| | | | | | |
|---|---|---|---|---|---|
| CGF | Charging Gateway Function | CPE | Customer Premise Equipment | CSI-IM | CSI Interference Measurement |
| CHF | Charging Function | CPICH | Common Pilot Channel | CSI-RS | CSI Reference Signal |
| CI | Cell Identity | CQI | Channel Quality Indicator | CSI-RSRP | CSI reference signal received power |
| CID | Cell-ID (e.g., positioning method) | CPU | CSI processing unit, Central Processing Unit | CSI-RSRQ | CSI reference signal received quality |
| CIM | Common Information Model | C/R | Command/Response field bit | | |
| CIR | Carrier to Interference Ratio | CRAN | Cloud Radio Access Network, Cloud RAN | CSI-SINR | CSI signal-to-noise and interference ratio |
| CK | Cipher Key | | | | |
| CM | Connection Management, Conditional Mandatory | CRB | Common Resource Block | CSMA | Carrier Sense Multiple Access |
| CMAS | Commercial Mobile Alert Service | CRC | Cyclic Redundancy Check | CSMA/CA | CSMA with collision avoidance |
| CMD | Command | CRI | Channel-State Information Resource Indicator, CSI-RS Resource Indicator | CSS | Common Search Space, Cell-specific Search Space |
| CMS | Cloud Management System | | | | |
| CO | Conditional Optional | | | CTF | Charging Trigger Function |
| CoMP | Coordinated Multi-Point | C-RNTI | Cell RNTI | | |
| CORESET | Control Resource Set | CS | Circuit Switched | CTS | Clear-to-Send |
| | | DwPTS | Downlink Pilot Time Slot | CW | Codeword |
| CWS | Contention Window Size | E-LAN | Ethernet Local Area Network | EECID | Edge Enabler Client Identification |
| D2D | Device-to-Device | E2E | End-to-End | EES | Edge Enabler Server |
| DC | Dual Connectivity, Direct Current | EAS | Edge Application Server | EESID | Edge Enabler Server Identification |
| DCI | Downlink Control Information | ECCA | extended clear channel assessment, extended CCA | EHE | Edge Hosting Environment |
| DF | Deployment Flavour | | | | |
| DL | Downlink | ECCE | Enhanced Control Channel Element, Enhanced CCE | EGMF | Exposure Governance Management Function |
| DMTF | Distributed Management Task Force | | | | |
| DPDK | Data Plane Development Kit | ED | Energy Detection | | |
| | | EDGE | Enhanced Datarates for GSM Evolution (GSM Evolution) | EGPRS | Enhanced GPRS |
| DM-RS, DMRS | Demodulation Reference Signal | | | EIR | Equipment Identity Register |
| DN | Data network | EAS | Edge Application Server | eLAA | enhanced Licensed Assisted Access, enhanced LAA |
| DNN | Data Network Name | EASID | Edge Application Server Identification | | |
| DNAI | Data Network Access Identifier | | | EM | Element Manager |
| DRB | Data Radio Bearer | ECS | Edge Configuration Server | eMBB | Enhanced Mobile Broadband |
| DRS | Discovery Reference Signal | ECSP | Edge Computing Service Provider | EMS | Element Management System |
| DRX | Discontinuous Reception | | | eNB | evolved NodeB, E-UTRAN Node B |
| DSL | Domain Specific Language. Digital Subscriber Line | EDN | Edge Data Network | EN-DC | E-UTRA-NR Dual Connectivity |
| | | EEC | Edge Enabler Client | EPC | Evolved Packet Core |
| DSLAM | DSL Access Multiplexer | FACCH | Fast Associated Control CHannel | FFT | Fast Fourier Transformation |
| EPDCCH | enhanced PDCCH, enhanced Physical Downlink Control Cannel | FACCH/F | Fast Associated Control Channel/Full rate | feLAA | further enhanced Licensed Assisted Access, further enhanced LAA |
| EPRE | Energy per resource element | FACCH/H | Fast Associated Control Channel/Half rate | FN | Frame Number |
| EPS | Evolved Packet System | | | FPGA | Field-Programmable Gate Array |
| EREG | enhanced REG, enhanced resource element groups | FACH | Forward Access Channel | FR | Frequency Range |
| | | FAUSCH | Fast Uplink Signalling Channel | FQDN | Fully Qualified Domain Name |
| ETSI | European Telecommunications Standards Institute | FB | Functional Block | G-RNTI | GERAN Radio Network Temporary Identity |
| | | FBI | Feedback Information | | |
| ETWS | Earthquake and Tsunami Warning System | FCC | Federal Communications Commission | GERAN | GSM EDGE RAN, GSM EDGE Radio Access Network |
| eUICC | embedded UICC, embedded Universal Integrated Circuit Card | FCCH | Frequency Correction CHannel | GGSN | Gateway GPRS Support Node |

| | | | | | |
|---|---|---|---|---|---|
| E-UTRA | Evolved UTRA | FDD | Frequency Division Duplex | GLONASS | GLObal'naya NAvigatsionnaya Sputnikovaya Sistema (Engl.: Global Navigation Satellite System) |
| E-UTRAN | Evolved UTRAN | FDM | Frequency Division Multiplex | | |
| EV2X | Enhanced V2X | FDMA | Frequency Division Multiple Access | | |
| F1AP | F1 Application Protocol | FE | Front End | gNB | Next Generation NodeB |
| F1-C | F1 Control plane interface | FEC | Forward Error Correction | gNB-CU | gNB-centralized unit, Next Generation NodeB centralized unit |
| F1-U | F1 User plane interface | FFS | For Further Study | | |
| | | HFN | HyperFrame Number | | |
| gNB-DU | gNB-distributed unit, Next Generation NodeB distributed unit | HHO | Hard Handover | IAB | Integrated Access and Backhaul |
| | | HLR | Home Location Register | ICIC | Inter-Cell Interference Coordination |
| GNSS | Global Navigation Satellite System | HN | Home Network | | |
| | | HO | Handover | ID | Identity, identifier |
| GPRS | General Packet Radio Service | HPLMN | Home Public Land Mobile Network | IDFT | Inverse Discrete Fourier Transform |
| GPSI | Generic Public Subscription Identifier | HSDPA | High Speed Downlink Packet Access | IE | Information element |
| | | | | IBE | In-Band Emission |
| | | | | IEEE | Institute of Electrical and Electronics Engineers |
| GSM | Global System for Mobile Communications, Groupe Spécial Mobile | HSN | Hopping Sequence Number | | |
| | | HSPA | High Speed Packet Access | IEI | Information Element Identifier |
| | | HSS | Home Subscriber Server | IEIDL | Information Element Identifier Data Length |
| GTP | GPRS Tunneling Protocol | HSUPA | High Speed Uplink Packet Access | IETF | Internet Engineering Task Force |
| GTP-UGPRS | Tunnelling Protocol for User Plane | HTTP | Hyper Text Transfer Protocol | IF | Infrastructure |
| GTS | Go To Sleep Signal (related to WUS) | HTTPS | Hyper Text Transfer Protocol Secure (https is http/1.1 over SSL, i.e. port 443) | IIOT | Industrial Internet of Things |
| GUMMEI | Globally Unique MME Identifier | | | IM | Interference Measurement, Intermodulation, IP Multimedia |
| GUTI | Globally Unique Temporary UE Identity | I-Block | Information Block | IMC | IMS Credentials |
| HARQ | Hybrid ARQ, Hybrid Automatic Repeat Request | ICCID | Integrated Circuit Card Identification | IMEI | International Mobile Equipment Identity |
| HANDO | Handover | ISP | Internet Service Provider | IMGI | International mobile group identity |
| IMPI | IP Multimedia Private Identity | IWF | Interworking-Function | L3 | Layer 3 (network layer) |
| IMPU | IP Multimedia PUblic identity | I-WLAN | Interworking WLAN | LAA | Licensed Assisted Access |
| IMS | IP Multimedia Subsystem | | Constraint length of the convolutional code, USIM Individual key | LAN | Local Area Network |
| IMSI | International Mobile Subscriber Identity | | | LADN | Local Area Data Network |
| IoT | Internet of Things | kB | Kilobyte (1000 bytes) | LBT | Listen Before Talk |
| IP | Internet Protocol | | | LCM | LifeCycle Management |
| Ipsec | IP Security, Internet Protocol Security | kbps | kilo-bits per second | | |
| | | Kc | Ciphering key | LCR | Low Chip Rate |
| IP-CAN | IP-Connectivity Access Network | Ki | Individual subscriber authentication key | LCS | Location Services |
| | | | | LCID | Logical Channel ID |
| IP-M | IP Multicast | KPI | Key Performance Indicator | LI | Layer Indicator |
| IPv4 | Internet Protocol Version 4 | | | LLC | Logical Link Control, Low Layer Compatibility |
| | | KQI | Key Quality Indicator | | |
| IPv6 | Internet Protocol Version 6 | KSI | Key Set Identifier | LMF | Location Management Function |
| IR | Infrared | ksps | kilo-symbols per second | LOS | Line of Sight |
| IS | In Sync | | | | |
| IRP | Integration Reference Point | KVM | Kernel Virtual Machine | LPLMN | Local PLMN |
| | | | | LPP | LTE Positioning Protocol |
| ISDN | Integrated Services Digital Network | L1 | Layer 1 (physical layer) | LSB | Least Significant Bit |
| ISIM | IM Services Identity Module | L1-RSRP | Layer 1 reference signal received power | LTE | Long Term Evolution |
| ISO | International Organisation for Standardisation | | | LWA | LTE-WLAN aggregation |
| | | L2 | Layer 2 (data link layer) | LWIP | LTE/WLAN Radio Level Integration with IPsec Tunnel |
| LTE | Long Term Evolution | MCOT | Maximum Channel Occupancy Time | | |
| M2M | Machine-to-Machine | MCS | Modulation and coding scheme | MO | Measurement Object, Mobile |

| | | | | | | |
|---|---|---|---|---|---|---|
| MAC | Medium Access Control (protocol layering context) | MDAF | Management Data Analytics Function | MPBCH | Originated MTC Physical Broadcast CHannel |
| MAC | Message authentication code (security/encryption context) | MDAS | Management Data Analytics Service | MPDCCH | MTC Physical Downlink Control CHannel |
| | | MDT | Minimization of Drive Tests | | |
| | | ME | Mobile Equipment | | |
| MAC-A | MAC used for authentication and key agreement (TSG T WG3 context) | MeNB | master eNB | MPDSCH | MTC Physical Downlink Shared CHannel |
| | | MER | Message Error Ratio | | |
| | | MGL | Measurement Gap Length | MPRACH | MTC Physical Random Access CHannel |
| MAC-IMAC | used for data integrity of signalling messages (TSG T WG3 context) | MGRP | Measurement Gap Repetition Period | | |
| | | MIB | Master Information Block, Management Information Base | MPUSCH | MTC Physical Uplink Shared Channel |
| MANO | Management and Orchestration | MIMO | Multiple Input Multiple Output | MPLS | MultiProtocol Label Switching |
| MBMS | Multimedia Broadcast and Multicast Service | MLC | Mobile Location Centre | MS | Mobile Station |
| | | | | MSB | Most Significant Bit |
| MBSFN | Multimedia Broadcast multicast service Single Frequency Network | MM | Mobility Management | MSC | Mobile Switching Centre |
| | | MME | Mobility Management Entity | MSI | Minimum System Information, MCH Scheduling Information |
| MCC | Mobile Country Code | MN | Master Node | | |
| | | MNO | Mobile Network Operator | MSID | Mobile Station Identifier |
| MCG | Master Cell Group | | | | |
| MSIN | Mobile Station Identification Number | NE-DC | NR-E-UTRA Dual Connectivity | NPDSCH | Narrowband Physical Downlink Shared CHannel |
| | | NEF | Network Exposure Function | | |
| MSISDN | Mobile Subscriber ISDN Number | NF | Network Function | NPRACH | Narrowband Physical Random Access CHannel |
| | | NFP | Network Forwarding Path | | |
| MT | Mobile Terminated, Mobile Termination | NFPD | Network Forwarding Path Descriptor | NPUSCH | Narrowband Physical Uplink Shared CHannel |
| MTC | Machine-Type Communications | | | | |
| mMTC | massive MTC, massive Machine-Type Communications | NFV | Network Functions Virtualization | NPSS | Narrowband Primary Synchronization Signal |
| | | NFVI | NFV Infrastructure | | |
| MU-MIMO | Multi User MIMO | NFVO | NFV Orchestrator | | |
| | | NG | Next Generation, Next Gen | NSSS | Narrowband Secondary Synchronization Signal |
| MWUS | MTC wake-up signal, MTC WUS | NGEN-DC | NG-RAN E-UTRA-NR Dual Connectivity | | |
| NACK | Negative Acknowledgement | | | NR | New Radio, Neighbour Relation |
| NAI | Network Access Identifier | NM | Network Manager | | |
| | | NMS | Network Management System | NRF | NF Repository Function |
| NAS | Non-Access Stratum, Non-Access Stratum layer | N-PoP | Network Point of Presence | NRS | Narrowband Reference Signal |
| NCT | Network Connectivity Topology | NMIB, N-MIB | Narrowband MIB | NS | Network Service |
| | | | | NSA | Non-Standalone operation mode |
| NC-JT | Non-Coherent Joint Transmission | NPBCH | Narrowband Physical Broadcast CHannel | NSD | Network Service Descriptor |
| NEC | Network Capability Exposure | NPDCCH | Narrowband Physical Downlink Control CHannel | NSR | Network Service Record |
| NSSAI | Network Slice Selection Assistance Information | | | PDSCH | Physical Downlink Shared Channel |
| | | PAR | Peak to Average Ratio | | |
| S-NNSAI | Single-NSSAI | PBCH | Physical Broadcast Channel | PDU | Protocol Data Unit |
| | | | | PEI | Permanent Equipment Identifiers |
| NSSF | Network Slice Selection Function | PC | Power Control, Personal Computer | PFD | Packet Flow Description |
| NW | Network | PCC | Primary Component Carrier, Primary CC | P-GW | PDN Gateway |
| NWUS | Narrowband wake-up signal, Narrowband WUS | | | PHICH | Physical hybrid-ARQ indicator channel |
| | | P-CSCF | Proxy CSCF | | |
| | | PCell | Primary Cell | | |
| NZP | Non-Zero Power | PCI | Physical Cell ID, Physical Cell Identity | PHY | Physical layer |
| O&M | Operation and Maintenance | PCEF | Policy and Charging Enforcement Function | PLMN | Public Land Mobile Network |
| ODU2 | Optical channel Data Unit - type 2 | | | PIN | Personal Identification Number |
| OFDM | Orthogonal Frequency Division Multiplexing | PCF | Policy Control Function | PM | Performance Measurement |
| | | PCRF | Policy Control and | | |

| | | | | | |
|---|---|---|---|---|---|
| OFDMA | Orthogonal Frequency Division Multiple Access | PDCP | Charging Rules Function Packet Data Convergence Protocol, | PMI PNF | Precoding Matrix Indicator Physical Network Function |
| OOB | Out-of-band | | Packet Data Convergence | PNFD | Physical Network |
| OOS | Out of Sync | | Protocol layer | | Function Descriptor |
| OPEX | OPerating EXpense | PDCCH | Physical | PNFR | Physical Network |
| OSI | Other System Information | | Downlink Control Channel | POC | Function Record PTT over Cellular |
| OSS | Operations Support System | PDCP | Packet Data Convergence Protocol | PP, PTP PPP | Point-to-Point Point-to-Point |
| OTA | over-the-air | PDN | Packet Data | | Protocol |
| PAPR | Peak-to-Average Power Ratio | | Network, Public Data Network | RACH | Random Access Channel |
| PRACH | Physical RACH | PSS | Primary Synchronization | RADIUS | Remote Authentication Dial In |
| PRB | Physical resource block | | Signal | | User Service |
| PRG | Physical resource block group | PSTN | Public Switched Telephone Network | RAN | Radio Access Network |
| ProSe | Proximity Services, Proximity-Based Service | PT-RS PTT | Phase-tracking reference signal Push-to-Talk | RAND | RANDom number (used for authentication) |
| PRS | Positioning Reference Signal | PUCCH | Physical Uplink Control | RAR | Random Access Response |
| PRR | Packet Reception Radio | PUSCH | Channel Physical | RAT | Radio Access Technology |
| PS | Packet Services | | Uplink Shared | RAU | Routing Area |
| PSBCH | Physical Sidelink Broadcast Channel | QAM | Channel Quadrature Amplitude Modulation | RB | Update Resource block, Radio Bearer |
| PSDCH | Physical Sidelink Downlink | QCI | QoS class of identifier | RBG | Resource block group |
| | Channel | QCL | Quasi co-location | REG | Resource Element |
| PSCCH | Physical Sidelink Control Channel | QFI QoS | QoS Flow ID, QoS Flow Identifier Quality of Service | Rel REQ | Group Release REQuest |
| PSSCH | Physical Sidelink Shared Channel | QPSK | Quadrature (Quaternary) Phase Shift Keying | RF RI RIV | Radio Frequency Rank Indicator Resource indicator |
| PSFCH | physical sidelink feedback channel | QZSS RA-RNTI | Quasi-Zenith Satellite System Random | RL RLC | value Radio Link Radio Link Control, |
| PSCell | Primary SCell | | Access RNTI | | Radio Link Control layer |
| RLC AM | RLC Acknowledged Mode | RAB | Radio Access Bearer, Random | SAP | Service Access Point |
| RLC UM | RLC Unacknowledged Mode | RSRP | Access Burst Reference Signal | SAPD | Service Access Point Descriptor |
| RLF | Radio Link Failure | | Received Power | SAPI | Service Access |
| RLM | Radio Link Monitoring | RSRQ | Reference Signal Received Quality | SCC | Point Identifier Secondary |
| RLM-RS | Reference Signal for RLM | RSSI | Received Signal Strength Indicator | | Component Carrier, Secondary CC |
| RM | Registration Management | RSU RSTD | Road Side Unit Reference Signal | SCell SCEF | Secondary Cell Service |
| RMC | Reference Measurement Channel | RTP | Time difference Real Time Protocol | | Capability Exposure Function |
| RMSI | Remaining MSI, Remaining Minimum System Information | RTS RTT Rx | Ready-To-Send Round Trip Time Reception, | SC-FDMA | Single Carrier Frequency Division Multiple |
| RN | Relay Node | | Receiving, Receiver | | Access |
| RNC | Radio Network Controller | S1AP | S1 Application Protocol | SCG | Secondary Cell Group |
| RNL | Radio Network Layer | S1-MME | S1 for the control plane | SCM | Security Context Management |
| RNTI | Radio Network Temporary Identifier | S1-U S-CSCF | S1 for the user plane serving | SCS SCTP | Subcarrier Spacing Stream Control |
| ROHC | RObust Header Compression | S-GW | CSCF Serving Gateway | | Transmission Protocol |
| RRC | Radio Resource Control, Radio Resource Control layer | S-RNTI | SRNC Radio Network Temporary Identity | SDAP | Service Data Adaptation Protocol, Service Data Adaptation |
| RRM | Radio Resource Management | S-TMSI | SAE Temporary Mobile | SDL | Protocol layer Supplementary |
| RS | Reference Signal | | Station Identifier | | Downlink |
| SDNF | Structured Data Storage Network Function | SA SAE | Standalone operation mode System Architecture | SRS SS | Sounding Reference Signal Synchronization |
| SDP | Session Description Protocol | SIM | Evolution Subscriber Identity | SSB | Signal Synchronization |

| | | | | | |
|---|---|---|---|---|---|
| SDSF | Structured Data Storage Function | SIP | Module Session Initiated Protocol | SSID | Signal Block Service Set Identifier |
| SDT | Small Data Transmission | SiP | System in Package | | SS/PBCH Block |
| SDU | Service Data Unit | SL | Sidelink | SSBRI | SS/PBCH Block |
| SEAF | Security Anchor Function | SLA | Service Level Agreement | | Resource Indicator, Synchronization |
| SeNB | secondary eNB | SM | Session | | Signal Block |
| SEPP | Security Edge Protection Proxy | SMF | Management Session | SSC | Resource Indicator Session and Service |
| SFI | Slot format indication | SMS | Management Function Short Message | SS-RSRP | Continuity Synchronization |
| SFTD | Space-Frequency Time Diversity, SFN and frame timing difference | SMSF SMTC | Service SMS Function SSB-based | | Signal based Reference Signal Received Power |
| SFN | System Frame Number | | Measurement Timing Configuration | SS-RSRQ | Synchronization Signal based Reference |
| SgNB | Secondary gNB | SN | Secondary Node, | | Signal Received |
| SGSN | Serving GPRS Support Node | SoC | Sequence Number System on Chip | SS-SINR | Quality Synchronization |
| S-GW | Serving Gateway | SON | Self-Organizing | | Signal based Signal to |
| SI | System Information | | Network | | Noise and Interference |
| SI-RNTI | System Information RNTI | SpCell SP-CSI-RNTI | Special Cell Semi- | U-RNTI | Ratio UTRAN |
| SIB | System Information Block | SPS | Persistent CSI RNTI Semi-Persistent | | Radio Network Temporary Identity |
| SSS | Secondary Synchronization Signal | SQN | Scheduling Sequence number | UART | Universal Asynchronous Receiver and |
| SSSG | Search Space Set Group | SR SRB | Scheduling Request Signalling Radio Bearer | UCI | Transmitter Uplink Control Information |
| SSSIF | Search Space Set Indicator | TDM | Time Division Multiplexing | UE | User Equipment |
| SST | Slice/Service Types | TDMA | Time Division | UDM | Unified Data |
| SU-MIMO | Single User MIMO | TE | Multiple Access Terminal Equipment | UDP | Management User Datagram |
| SUL | Supplementary Uplink | TEID | Tunnel End Point Identifier | UDSF | Protocol Unstructured Data |
| TA | Timing Advance, Tracking Area | TFT | Traffic Flow Template | | Storage Network Function |
| TAC | Tracking Area Code | TMSI | Temporary Mobile | UICC | Universal Integrated |
| TAG | Timing Advance Group | TNL | Subscriber Identity Transport Network | UL | Circuit Card Uplink |
| TAI | Tracking Area Identity | TPC | Layer Transmit Power | UM | Unacknowledged Mode |
| TAU | Tracking Area Update | TPMI | Control Transmitted | UML | Unified Modelling Language |
| TB | Transport Block | | Precoding Matrix | UMTS | Universal Mobile |
| TBS | Transport Block Size | TR | Indicator Technical Report | | Telecommunications System |
| TBD | To Be Defined | TRP, TRxP | Transmission | UP | User Plane |
| TCI | Transmission Configuration Indicator | TRS | Reception Point Tracking Reference | UPF URI | User Plane Function Uniform Resource |
| TCP | Transmission Communication Protocol | TRx TS | Signal Transceiver Technical | XRES | Identifier EXpected user RESponse |
| TDD | Time Division Duplex | | Specifications, Technical Standard | XOR ZC | exclusive OR Zadoff-Chu |
| URL | Uniform Resource Locator | TTI | Transmission Time Interval | ZP | Zero Power |
| URLLC | Ultra-Reliable and Low Latency | Tx | Transmission, Transmitting, Transmitter | | |
| USB | Universal Serial Bus | VNF | Virtualized Network | | |
| USIM | Universal Subscriber Identity Module | VNFFG | Function VNF | | |
| USS | UE-specific search space | VNFFGD | Forwarding Graph VNF | | |
| UTRA | UMTS Terrestrial Radio Access | | Forwarding Graph Descriptor | | |
| UTRAN | Universal Terrestrial Radio Access Network | VNFM VoIP | VNF Manager Voice-over-IP, Voice-over- Internet | | |
| UwPTS | Uplink Pilot Time Slot | VPLMN | Protocol Visited | | |
| V2I | Vehicle-to-Infrastructure | | Public Land Mobile Network | | |
| V2P | Vehicle-to-Pedestrian | VPN | Virtual Private Network | | |

-continued

| | | | |
|---|---|---|---|
| V2V | Vehicle-to-Vehicle | VRB | Virtual Resource Block |
| V2X | Vehicle-to-everything | WiMAX | Worldwide Interoperability for Microwave Access |
| VIM | Virtualized Infrastructure Manager | | |
| VL | Virtual Link, | WLAN | Wireless Local Area Network |
| VLAN | Virtual LAN, Virtual Local Area Network | WMAN | Wireless Metropolitan Area Network |
| VM | Virtual Machine | WPAN | Wireless Personal Area Network |
| | | X2-C | X2-Control plane |
| | | X2-U | X2-User plane |
| | | XML | extensible Markup Language |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators.

The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The invention claimed is:

1. One or more non-transitory computer-readable media (NTCRM) having instructions, stored thereon, that when executed by one or more processors of a user equipment (UE) configure the UE to:
   receive configuration information to indicate physical random access channel (PRACH) occasions associated with respective synchronization signal blocks (SSBs);
   determine a physical random access channel (PRACH) repetition window to include a number of consecutive valid PRACH occasions of a first SSB of the SSBs;
   identify the valid PRACH occasions based on whether each PRACH occasion satisfies one or more predefined conditions associated with uplink resource availability or scheduling constraints; and
   encode a PRACH preamble for transmission in the valid PRACH occasions of the PRACH repetition window.

2. The one or more NTCRM of claim 1, wherein one or more PRACH occasions of a second SSB of the SSBs are between the valid PRACH occasions of the PRACH repetition window.

3. The one or more NTCRM of claim 1, wherein the instructions, when executed, are further to configure the UE to decode an indication of the number of PRACH occasions in the PRACH repetition window.

4. The one or more NTCRM of claim 1, wherein the instructions, when executed, are further to configure the UE to identify the valid PRACH occasions based on one or more validation rules.

5. The one or more NTCRM of claim 1, wherein a gap between two of the valid PRACH occasions of the first SSB is determined based on a number of valid PRACH occasions that are mapped to all of the SSBs.

6. The one or more NTCRM of claim 1, wherein the PRACH repetition window is a first PRACH repetition window of a plurality of PRACH repetition windows associated with the respective SSBs.

7. The one or more NTCRM of claim 6, wherein the first PRACH repetition window starts with a frame 0.

8. The one or more NTCRM of claim 1, wherein the instructions, when executed, are further to configure the UE to receive an indication of an association period for determination of the PRACH repetition window.

9. The one or more NTCRM of claim 1, wherein the consecutive valid PRACH occasions associated with the first SSB are PRACH occasions that are multiplexed in a time domain or a frequency domain.

10. One or more non-transitory computer-readable media (NTCRM) having instructions, stored thereon, that when executed by one or more processors of a next generation Node B (gNB) configure the gNB to:
    encode, for transmission to a user equipment (UE), configuration information to indicate physical random access channel (PRACH) occasions associated with respective synchronization signal blocks (SSBs);
    determine a physical random access channel (PRACH) repetition window to include a number of consecutive valid PRACH occasions of a first SSB of the SSBs;
    identify the valid PRACH occasions based on whether each PRACH occasion satisfies one or more predefined conditions associated with uplink resource availability or scheduling constraints; and
    receive a PRACH preamble in the valid PRACH occasions of the PRACH repetition window.

11. The one or more NTCRM of claim 10, wherein one or more PRACH occasions of a second SSB of the SSBs are between the valid PRACH occasions of the PRACH repetition window.

12. The one or more NTCRM of claim 10, wherein the instructions, when executed, are further to configure the gNB to encode, for transmission to the UE, an indication of the number of PRACH occasions in the PRACH repetition window.

13. The one or more NTCRM of claim 10, wherein the valid PRACH occasions are based on one or more validation rules.

14. The one or more NTCRM of claim 10, wherein a gap between two of the valid PRACH occasions of the first SSB is determined based on a number of valid PRACH occasions that are mapped to all of the SSBs.

15. The one or more NTCRM of claim 10, wherein the PRACH repetition window is a first PRACH repetition window of a plurality of PRACH repetition windows associated with the respective SSBs.

16. The one or more NTCRM of claim 15, wherein the first PRACH repetition window starts with a frame 0.

17. The one or more NTCRM of claim 10, wherein the instructions, when executed, are further to configure the gNB to encode, for transmission to the UE, an indication of an association period for determination of the PRACH repetition window.

18. The one or more NTCRM of claim 10, wherein the consecutive valid PRACH occasions associated with the first SSB are PRACH occasions that are multiplexed in a time domain or a frequency domain.

* * * * *